(12) United States Patent
Kobayashi et al.

(10) Patent No.: US 8,975,592 B2
(45) Date of Patent: Mar. 10, 2015

(54) ION DETECTOR

(71) Applicant: Hamamatsu Photonics K.K., Hamamatsu-shi, Shizuoka (JP)

(72) Inventors: Hiroshi Kobayashi, Hamamatsu (JP); Motohiro Suyama, Hamamatsu (JP); Masahiro Kotani, Hamamatsu (JP); Takayuki Ohmura, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 128 days.

(21) Appl. No.: 13/744,863

(22) Filed: Jan. 18, 2013

(65) Prior Publication Data

US 2013/0187057 A1    Jul. 25, 2013

(30) Foreign Application Priority Data

Jan. 25, 2012 (JP) ................. 2012-013067
Jan. 25, 2012 (JP) ................. 2012-013068
Dec. 26, 2012 (JP) ................. 2012-282857

(51) Int. Cl.
*G01T 1/20* (2006.01)
*G01T 1/28* (2006.01)

(52) U.S. Cl.
CPC ...................... *G01T 1/28* (2013.01)
USPC .................... 250/370.11

(58) Field of Classification Search
CPC ................ G01T 1/28; H01J 2237/2444
USPC ....................... 250/370.11, 281
See application file for complete search history.

(56) References Cited

U.S. PATENT DOCUMENTS

| | | | |
|---|---|---|---|
| 3,617,736 A * | 11/1971 | Barnett et al. | 250/290 |
| 4,810,882 A | 3/1989 | Bateman | |
| 4,896,035 A * | 1/1990 | Mahoney et al. | 850/8 |
| 5,777,326 A * | 7/1998 | Rockwood et al. | 250/287 |
| 5,883,466 A | 3/1999 | Suyama et al. | |
| 6,025,590 A | 2/2000 | Itoi | |
| 6,861,650 B2 | 3/2005 | Kondo et al. | |
| 6,958,474 B2 | 10/2005 | Laprade et al. | |
| 7,728,292 B2 | 6/2010 | Jolliffe et al. | |
| 2009/0294687 A1 | 12/2009 | Shofman et al. | |
| 2010/0294931 A1 | 11/2010 | Zarchin et al. | |
| 2013/0068942 A1* | 3/2013 | Verenchikov | 250/282 |

FOREIGN PATENT DOCUMENTS

| | | |
|---|---|---|
| FR | 2 658 361 | 8/1991 |
| JP | 63-276862 | 11/1988 |
| JP | 7-326315 | 12/1995 |
| JP | 10-154483 | 6/1998 |
| JP | 10-188878 | 7/1998 |
| JP | 4608572 | 1/2011 |
| JP | 4639379 | 2/2011 |

* cited by examiner

Primary Examiner — Kiho Kim
(74) Attorney, Agent, or Firm — Drinker Biddle & Reath LLP

(57) ABSTRACT

An ion detector 1A for detecting positive ions is provided with a chamber 2 having an ion entrance 3 which allows positive ions to enter, a conversion dynode 9 which is disposed in the chamber 2 and to which a negative potential is applied, and an avalanche photodiode 30 that is disposed in the chamber 2 and has an electron incident surface 30a which is opposed to the conversion dynode 9 and also into which secondary electrons emitted from the conversion dynode 9 are made incident. The electron incident surface 30a is located closer to the conversion dynode 9 than a positioning part 14 which supports the avalanche photodiode 30 in the grounded chamber 2.

9 Claims, 15 Drawing Sheets

ION DETECTOR

BACKGROUND OF THE INVENTION

1. Field of the Invention

The present invention relates to an ion detector which detects positive ions and also to an ion detector which detects positive ions and negative ions.

2. Related Background Art

Conventional ion detectors including conversion dynodes that emit secondary electrons by ion collisions, scintillators that emit light upon incidence of the secondary electrons emitted from the conversion dynodes, photodetectors that detect the light emitted by the scintillators have been known (refer to, for example, Japanese Patent Application Laid-Open No. H10-188878, Japanese Patent Application Laid-Open No. S63-276862 and Japanese Patent No. 4639379).

SUMMARY OF THE INVENTION

Meanwhile, the above-described ion detectors are required to be simplified in structure, in addition to an improvement in detection accuracy. In particular, afterglow that occurs in the process of converting secondary electrons by scintillators (fluorescent materials) has posed a serious problem in improving the detection accuracy.

Therefore, the present invention is to provide an ion detector which is capable of improving the detection accuracy and also being simplified in structure.

An ion detector of an aspect of the present invention is an ion detector which detects positive ions and comprises a housing which has an ion entrance that allows the positive ions to enter, a conversion dynode which is disposed in the housing and to which a negative potential is applied and a semiconductor electron detector that is disposed in the housing and has an electron incident surface which is opposed to the conversion dynode and into which secondary electrons emitted from the conversion dynode are made incident, in which the electron incident surface is located closer to the conversion dynode than a part which supports the semiconductor electron detector in the grounded housing.

In this ion detector, since no scintillators (fluorescent materials) are used, afterglow will not occur. Further, in the ion detector, when positive ions enter into the housing via the ion entrance, the positive ions travel toward the conversion dynode to which a negative potential has been applied and collide with the conversion dynode. When secondary electrons are emitted from the conversion dynode by the positive ion collisions, the secondary electrons are made incident into the electron incident surface of the semiconductor electron detector and detected by the semiconductor electron detector. Here, the electron incident surface is located closer to the conversion dynode than the part which supports the semiconductor electron detector, by which a distance between the conversion dynode and the electron incident surface is shortened to a greater extent. Therefore, it is possible to increase the convergent property of the secondary electrons emitted from the conversion dynode. Further, since the secondary electrons are increased in convergent property, the electron incident surface for accepting the secondary electrons can be decreased in area to downsize the semiconductor electron detector. The downsized semiconductor electron detector makes it possible to increase response characteristics of the semiconductor electron detector and also reduce noise. Thereby, the ion detector is capable of improving detection accuracy.

The ion detector of the present invention may further comprise a cover electrode that is disposed in the housing and has an electron passage port through which the secondary electrons traveling from the conversion dynode to the semiconductor electron detector pass, in which the semiconductor electron detector may be an avalanche photodiode.

In the ion detector, when positive ions enter into the housing via the ion entrance, the positive ions travel toward the conversion dynode to which a negative potential has been applied and collide with the conversion dynode. When secondary electrons are emitted from the conversion dynode by the positive ion collisions, the secondary electrons are made incident into an electron incident surface of the avalanche photodiode via the electron passage port of the cover electrode and detected by the avalanche photodiode. As described above, use of the avalanche photodiode eliminates the need for a scintillator which converts secondary electrons to light, a light guide for guiding the light into a photoelectric multiplier or the like. It is thus possible to simplify the structure. Further, the avalanche photodiode is lower in multiplication fluctuation and greater in the number of detectable ions, for example, compared with a photoelectric multiplier, thus making it possible to improve a signal to noise ratio (hereinafter, referred to as "S/N ratio") and also enlarge a dynamic range (hereinafter, referred to as "D range"). Therefore, according to the above-described ion detector, it is possible to improve the detection accuracy and simplify the structure.

Here, the electron incident surface may include the electron passage port, when viewed from a direction in which the conversion dynode is opposed to the electron incident surface. The above-described configuration is able to suppress deterioration of the semiconductor electron detector due to secondary electron collisions with sites other than the electron incident surface in the semiconductor electron detector.

Further, where the cover electrode is additionally provided and the semiconductor electron detector is an avalanche photodiode, it is possible to suppress deterioration of the avalanche photodiode due to the secondary electron collisions with sites other than the electron incident surface in the avalanche photodiode.

Further, the cover electrode may be a part of a package which houses the semiconductor electron detector. This configuration is able to effectively use the part of the package as the cover electrode and simplify the structure to a greater extent.

Still further, the cover electrode may be electrically connected to the housing which is to be grounded. This configuration is able to electrically stabilize the housing and the cover electrode.

In addition, a first mesh to which a negative potential is applied may be placed at the ion entrance. This configuration is able to suppress formation of a positive electric field into the ion entrance and improve the incidence efficiency of positive ions in the conversion dynode.

At this time, a second mesh may be placed at the ion entrance so as to be located outside with respect to the first mesh and a positive potential may be applied to the second mesh so as to have an absolute value smaller than that of a potential to be applied to the first mesh. According to this configuration, positive ions relatively low in energy are repulsed so as to allow only positive ions relatively high in energy to pass through the ion entrance. At this time, negative ions are repulsed by the first mesh to which a negative potential has been applied. The energies of positive ions to be noise are often lower than the energies of positive ions which are to be detected. Therefore, the positive ions relatively low in energy are prevented from entering into the housing, thus making it possible to improve the S/N ratio of the ion detector.

Further, in the housing, a pair of electrode members which are equal in potential to the housing may be disposed so as to be located closer to the ion entrance than the conversion dynode and the electron incident surface and also so as to sandwich the ion entrance in a direction substantially orthogonal to a direction in which the conversion dynode is opposed to the electron incident surface, when viewed from the ion entrance side. According to this configuration, even when, for example, the ion entrance is formed so as to have a sectional shape taking as its longitudinal direction the direction in which the pair of electrode members are opposed, it is possible to converge positive ion trajectories to the conversion dynode and also improve the incidence efficiency of positive ions in the conversion dynode.

Still further, an ion detector of an aspect of the present invention is an ion detector which detects positive ions and negative ions. And, the ion detector comprises a housing which has an ion entrance for allowing positive ions and negative ions to enter, a conversion dynode which is disposed in the housing and to which a negative potential is applied, a semiconductor electron detector that is disposed in the housing and has an electron incident surface which is opposed to the conversion dynode and also into which secondary electrons emitted from the conversion dynode are made incident, and a cover electrode that is disposed in the housing and has an electron passage port through which the secondary electrons traveling from the conversion dynode to the semiconductor electron detector pass, in which a positive potential is applied at least to the cover electrode and the electron incident surface is located closer to the conversion dynode than a part which supports the semiconductor electron detector in the grounded housing.

In this ion detector, since no scintillators (fluorescent materials) are used, there will be no chance of occurrence of afterglow. Then, in the ion detector, when positive ions enter into the housing via the ion entrance, the positive ions travel toward the conversion dynode to which a negative potential has been applied and collide with the conversion dynode. When secondary electrons are emitted from the conversion dynode by the positive ion collisions, the secondary electrons are made incident into the electron incident surface of the semiconductor electron detector and detected by the semiconductor electron detector. On the other hand, when negative ions enter into the housing via the ion entrance, the negative ions travel toward the cover electrode to which a positive potential has been applied and collide with the cover electrode. Positive ions are emitted from the cover electrode by the negative ion collisions, and the positive ions travel toward the conversion dynode to which a negative potential has been applied and collide with the conversion dynode. When the secondary electrons are emitted from the conversion dynode by the positive ion collisions, the secondary electrons are made incident into the electron incident surface of the semiconductor electron detector and detected by the semiconductor electron detector. Here, the electron incident surface is located closer to the conversion dynode than the part which supports the semiconductor electron detector. Therefore, a distance between the conversion dynode and the electron incident surface is shortened to a greater extent. Thus, it is possible to increase the convergent property of secondary electrons emitted from the conversion dynode. Further, since the secondary electrons are increased in convergent property, it is possible to decrease an area of the electron incident surface for accepting the secondary electrons and also downsize the semiconductor electron detector.

The downsized semiconductor electron detector can enhance response characteristics of the semiconductor electron detector and also reduce noise. According to the ion detector, it is therefore possible to improve the detection accuracy.

Still further, a positive potential may be applied to the cover electrode and the electron incident surface, and the semiconductor electron detector may be an avalanche photodiode.

In the above-described ion detector, when positive ions enter into the housing via the ion entrance, the positive ions travel toward the conversion dynode to which a negative potential has been applied and collide with the conversion dynode. When secondary electrons are emitted from the conversion dynode by the positive ion collisions, the secondary electrons are made incident into the electron incident surface of the avalanche photodiode via the electron passage port of the cover electrode and detected by the avalanche photodiode. On the other hand, when negative ions enter into the housing via the ion entrance, the negative ions travel toward the cover electrode to which a positive potential has been applied and the electron incident surface of the avalanche photodiode and collide with the cover electrode and the electron incident surface. Positive ions are emitted from the cover electrode and the electron incident surface by the negative ion collisions, and the positive ions travel toward the conversion dynode to which a negative potential has been applied and collide with the conversion dynode. When secondary electrons are emitted from the conversion dynode by the positive ion collisions, the secondary electrons are made incident into the electron incident surface of the avalanche photodiode via the electron passage port of the cover electrode and detected by the avalanche photodiode. As described above, use of the avalanche photodiode eliminates the need for a scintillator which converts secondary electrons to light, a light guide which guides the light, for example, to a photoelectric multiplier or the like. It is, therefore, possible to simplify the structure. Further, the avalanche photodiode is lower in multiplication fluctuation and greater in the number of detectable ions, for example, compared with a photoelectric multiplier. Thus, a signal to noise ratio (hereinafter, referred to as "S/N ratio") can be improved and a dynamic range (hereinafter, referred to as "D range") can be enlarged. Thereby, according to the ion detector, it is possible to improve the detection accuracy and simplify the structure.

Here, the conversion dynode and the electron incident surface may be located with respect to the ion entrance in such a manner that a predetermined plane substantially orthogonal to a reference line that connects the conversion dynode and the electron incident surface includes a center line of the ion entrance, and a negative potential may be applied to the conversion dynode in such a manner that a negative equipotential surface formed by the conversion dynode and a positive equipotential surface formed at least by the cover electrode become substantially symmetrical with respect to the predetermined plane and also a positive potential may be applied at least to the cover electrode. According to the above-described configuration, positive ion trajectories to the conversion dynode, negative ion trajectories to the cover electrode and secondary electron trajectories to the electron incident surface of the semiconductor electron detector can be converged. And, it is thereby possible to improve the incidence efficiency of positive ions in the conversion dynode, the incidence efficiency of negative ions in the cover electrode and the incidence efficiency of secondary electrons on the electron incident surface of the semiconductor electron detector.

Where a positive potential is applied to the cover electrode and the electron incident surface and the semiconductor electron detector is an avalanche photodiode, positive ion trajectories to the conversion dynode, negative ion trajectories to the cover electrode and the electron incident surface of the avalanche photodiode and secondary electron trajectories to the electron incident surface of the avalanche photodiode can be converged. And, it is thereby possible to improve the incidence efficiency of positive ions in the conversion dynode, the incidence efficiency of negative ions in the cover electrode and the electron incident surface of the avalanche photodiode and the incidence efficiency of secondary electrons on the electron incident surface of the avalanche photodiode.

Further, the electron incident surface may include the electron passage port, when viewed from a direction in which the conversion dynode is opposed to the electron incident surface. According to this configuration, it is possible to suppress deterioration of the semiconductor electron detector due to the secondary electron collisions with sites other than the electron incident surface in semiconductor electron detector.

Where a positive potential is applied to the cover electrode and the electron incident surface and the semiconductor electron detector is an avalanche photodiode, it is possible to suppress deterioration of the avalanche photodiode due to secondary electron collisions with sites other than the electron incident surface in the avalanche photodiode.

Further, the cover electrode may be a part of a package which houses the semiconductor electron detector. According to this configuration, the part of the package can be effectively used as the cover electrode to simplify the structure to a greater extent.

Still further, the cover electrode may be electrically insulated from the housing which is to be grounded. According to this configuration, it is possible to electrically stabilize the housing.

In addition, a first mesh to which a positive potential and a negative potential are selectively applied may be placed at the ion entrance. According to the configuration, where positive ions are allowed to enter into the housing to detect the positive ions, a negative potential is applied to the first mesh to suppress the formation of a positive electric field inside the ion entrance. It is thus possible to improve the incidence efficiency of positive ions in the conversion dynode. On the other hand, where negative ions are allowed to enter into the housing to detect the negative ions, a positive potential is applied to the first mesh to suppress the formation of a negative electric field inside the ion entrance. It is thus possible to improve the incidence efficiency of negative ions in the cover electrode.

Where a positive potential is applied to the cover electrode and the electron incident surface and the semiconductor electron detector is an avalanche photodiode and where positive ions are allowed to enter into the housing to detect the positive ions, a negative potential is applied to the first mesh, thereby suppressing the formation of a positive electric field inside the ion entrance. It is thus possible to improve the incidence efficiency of positive ions in the conversion dynode. On the other hand, where negative ions are allowed to enter into the housing to detect the negative ions, a positive potential is applied to the first mesh, thereby suppressing the formation of a negative electric field inside the ion entrance. It is thus possible to improve the incidence efficiency of negative ions in the cover electrode and the electron incident surface of the avalanche photodiode.

At this time, a second mesh may be placed at the ion entrance so as to be located outside with respect to the first mesh, and a positive potential and a negative potential may be selectively applied to the second mesh so as to have an absolute value smaller than that of a potential which is applied to the first mesh and also so as to have a polarity opposite to that of a potential applied to the first mesh. According to the above-described configuration, where positive ions are allowed to enter into the housing to detect the positive ions, a positive potential is applied to the second mesh, by which positive ions relatively low in energy are repulsed and only positive ions relatively high in energy are allowed to pass. At this time, negative ions are repulsed by the first mesh to which a negative potential has been applied. On the other hand, where negative ions are allowed to enter into the housing to detect the negative ions, a negative potential is applied to the second mesh, by which negative ions relatively low in energy are repulsed and only negative ions relatively high in energy are allowed to pass. At this time, the positive ions are repulsed by the first mesh to which a positive potential has been applied. The energies of ions to be noise are often lower than the energies of ions which are to be detected. Therefore, ions relatively low in energy are prevented from entering into the housing, thus making it possible to improve the S/N ratio of the ion detector.

Further, a pair of electrode members which are equal in potential to the housing may be disposed in the housing so as to be located closer to the ion entrance than the conversion dynode and the electron incident surface and also so as to sandwich the ion entrance in a direction substantially orthogonal to a direction in which the conversion dynode is opposed to the electron incident surface, when viewed from the ion entrance side. According to the above-described configuration, even when, for example, the ion entrance is formed so as to have a sectional shape taking as its longitudinal direction the direction in which the pair of electrode members are opposed, positive ion trajectories to the conversion dynode and negative ion trajectories to the cover electrode can be converged. It is, thereby, possible to improve the incidence efficiency of positive ions in the conversion dynode and the incidence efficiency of negative ions in the cover electrode.

Where a positive potential is applied to the cover electrode and the electron incident surface and the semiconductor electron detector is an avalanche photodiode, even when, for example, the ion entrance is formed so as to have a sectional shape taking as its longitudinal direction the direction in which the pair of electrode members are opposed, positive ion trajectories to the conversion dynode and negative ion trajectories to the cover electrode and the electron incident surface of the avalanche photodiode can be converged. It is, thereby, possible to improve the incidence efficiency of positive ions in the conversion dynode and the incidence efficiency of negative ions in the cover electrode and the electron incident surface of the avalanche photodiode.

DESCRIPTION OF THE PREFERRED EMBODIMENTS

Hereinafter, embodiments for carrying out the present invention will be described in detail with reference to attached drawings. Also, the same elements are denoted with the same reference signs in the respective drawings, and an overlapping description will be omitted.

First Embodiment

Figure 1:
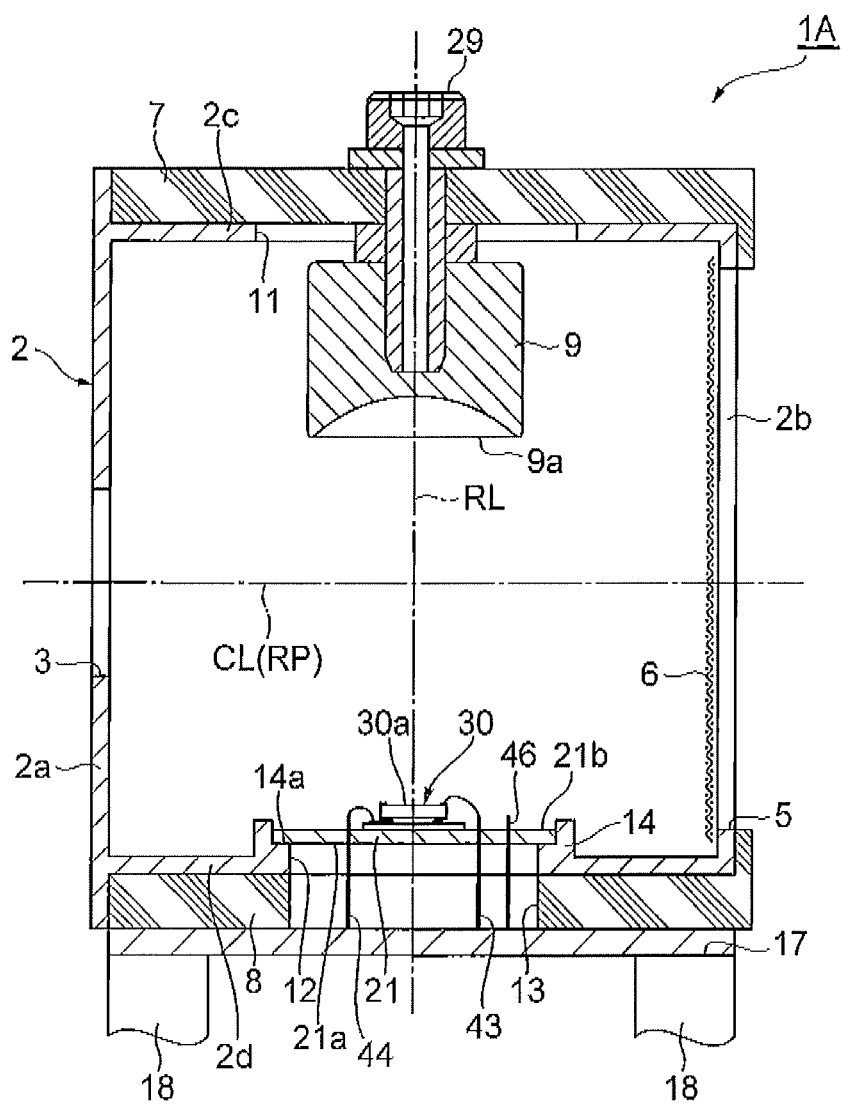
FIG. 1 is a longitudinal sectional view of an ion detector of a first embodiment of the present invention.
Figure 2:
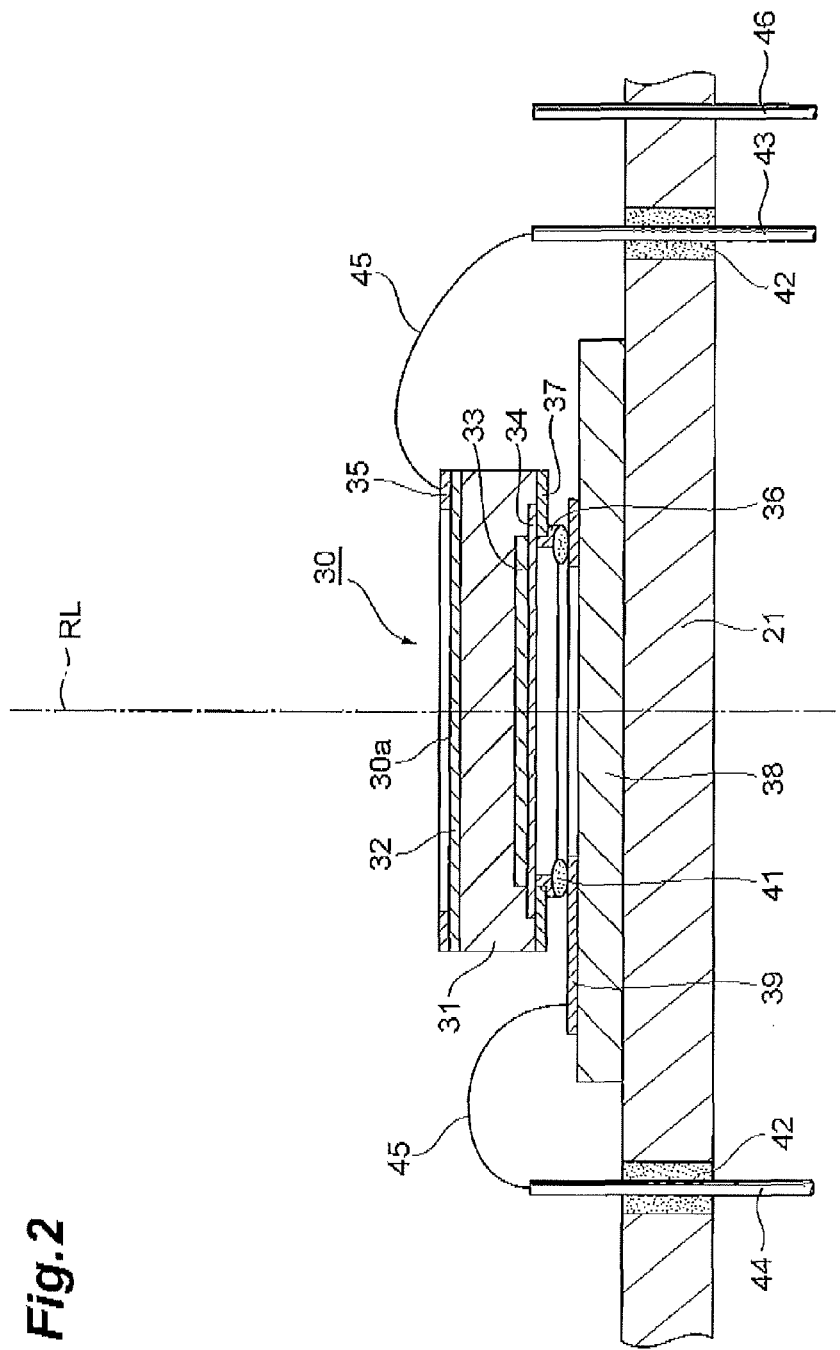
FIG. 2 is an enlarged view which shows the ion detector of the first embodiment in a state of being electrically connected to an avalanche photodiode.

FIG. 1 is a longitudinal sectional view of the ion detector of the first embodiment of the present invention. FIG. 2 is an enlarged view which shows the ion detector of the first embodiment in a state of being electrically connected to an avalanche photodiode.

As shown in FIG. 1, an ion detector 1A is provided with a rectangular parallelepiped box-shaped chamber (housing) 2 which is made of SUS 304 (stainless steel). On a side wall 2a of the chamber 2, there is installed an ion entrance 3 having a circular shape in section for allowing positive ions to enter (for example, about 10 mm in diameter). On a side wall 2b of the chamber 2 which is opposed to the side wall 2a, there is installed an opening 5 including the ion entrance 3, when viewed from a direction in which the side wall 2a is opposed to the side wall 2b. At the opening 5, a mesh 6 made of SUS is placed so as to run along an inner surface of the side wall 2b. An insulating member 7 made of a PEEK (polyether ether ketone) resin is disposed on an outer surface of a top wall 2c of the chamber 2, and an insulating member 8 made of a PEEK resin is disposed on an outer surface of a bottom wall 2d of the chamber 2. A bleeder substrate 17 made of a glass epoxy resin is disposed on an outer surface of the insulating member 8. The bleeder substrate 17 is disposed so as to almost completely cover the outer surface of the insulating member 8.

The ion detector 1A is supported on a support base (not illustrated). The support base is provided with a base seat made of a PEEK resin and leg parts 18 disposed between the ion detector 1A and the base seat. One end of each of the leg parts 18 is mounted on the outer surface of the bleeder substrate 17. The other end of each of the leg parts 18 is mounted on the support base.

A cylindrical (for example, about 12 mm in diameter) conversion dynode 9 (hereinafter, referred to as "CD 9") which is made of a high-ion/electron transforming material such as SUS 304 is disposed inside the chamber 2. The CD 9 is fixed with a screw 29 or the like to the insulating member 7 via an opening 11 installed on the top wall 2c of the chamber 2 by sandwiching a spacer made of a PEEK resin. The screw 29 is made of SUS 304 and also used as a terminal for supplying voltage to the CD 9.

Further, an avalanche photodiode 30 (hereinafter, referred to as "APD 30") is disposed inside the chamber 2 in a state of being disposed on a stem 21. The APD 30 is a back-illuminated type semiconductor electron detector. The APD 30 is provided with an electron incident surface 30a which is opposed to the CD 9 and also into which secondary electrons emitted from the CD 9 are made incident.

An opening 12 and an opening 13 are installed in a continuous manner respectively on the bottom wall 2d of the chamber 2 and the insulating member 8. The opening 12 and the opening 13 are blocked from inside the chamber 2 by the stein 21. Further, the opening 12 and the opening 13 are blocked from the outer surface of the insulating member 8 by the bleeder substrate 17.

The stem 21 which is in the shape of a circular plate and made of Kovar is disposed in the chamber 2. On an inner surface of the bottom wall 2d of the chamber 2, an annular positioning part 14 is installed integrally so as to project from the inner surface. An outer edge of the stem 21 is hermetically jointed to the bottom wall 2d in a state of being fitted into the positioning part 14. The positioning part 14 is installed integrally with the chamber 2 and, therefore, electrically equal in potential to the chamber 2.

The positioning part 14 is provided with a supporting surface 14a which is in contact with a back surface 21a of the stem 21. The supporting surface 14a is located closer to the CD 9 than the bottom wall 2d of the chamber 2. The stem 21 which is disposed at the above-described positioning part 14 is located closer to the CD 9 than the bottom wall 2d of the chamber 2. Therefore, the electron incident surface 30a of the APD 30 which is disposed in the stem 21 is located closer to the CD 9 than the positioning part 14, that is, a part which supports the APD 30 via the stem 21 in the grounded chamber 2. Here, in the grounded chamber 2, the part which supports the APD 30 is the positioning part 14 of the chamber 2. The positioning part 14 indirectly supports the APD 30 via the stem 21. The positioning part 14 is made integrally with the bottom wall 2d of the chamber 2. Further, the positioning part 14 is equal in potential to the grounded chamber 2. The part which is made integrally with the chamber 2 or fixed thereto and which is electrically equal in potential to the chamber 2 is deemed to be a part of the chamber 2.

Here, a detailed description will be given of the CD 9 which is disposed with respect to the stem 21. A main surface 9a of the CD 9 opposed to the bottom wall 2d of the chamber 2 is kept away from the top wall 2c of the chamber 2 by 5 mm to 15 mm in a direction along a reference line RL. For example, the main surface 9a of the CD 9 is kept away from the top wall 2c of the chamber 2 by 12 mm. On the other hand, a main surface 21b of the stem 21 opposed to the main surface 9a of the CD 9 is kept away from the bottom wall 2d of the chamber 2 by 5 mm to 15 mm in a direction along the reference line RL. For example, the main surface 21b of the stem 21 is kept away from the bottom wall 2d of the chamber 2 by 12 mm. As will be described later, the chamber 2 is connected to a ground potential, by which a potential of the chamber 2 is kept at 0 V. Therefore, in the present embodiment, a distance from the main surface 9a of the CD 9 to the main surface 21b of the stem 21 is set to be 10 mm to 25 mm and, for example, 17.8 mm.

Further, the reference line RL which connects a center point of the CD 9 and a center point of the electron incident surface 30a of the APD 30 is substantially orthogonal to a center line CL of the ion entrance 3. In other words, when a predetermined plane which is substantially orthogonal to the reference line RL and also includes the center line CL is given as a reference plane RP, the CD 9 and the electron incident surface 30a of the APD 30 are located with respect to the ion entrance 3 in such a manner that the reference plane RP which is substantially orthogonal to the reference line RL includes the center line CL. It is noted that in the CD 9, a recessed curved surface opposed to the electron incident surface 30a is, for example, about 8.5 mm in curvature radius.

As shown in FIG. 2, the APD 30 is provided with a low concentration p-type silicon substrate 31 which is in the shape of a rectangular plate. There is formed a high concentration p-layer 32 on a surface layer of the silicon substrate 31 which is on the side into which electrons are made incident. On a surface layer of the silicon substrate 31 which is on the side opposite to the side into which electrons are made incident, a p-layer 33 and a high concentration n-layer 34 are formed in this order from the side into which electrons are made incident, thereby realizing a pn joint. On a surface of the high concentration p-layer 32 which is on the side into which electrons are made incident, a p-electrode 35 which is electrically connected to the high, concentration p-layer 32 is formed annularly. In the APD 30, the surface of the high concentration p-layer 32 which is exposed from an inner region of the p-electrode 35 to the side into which electrons are made incident is given as the electron incident surface 30a. On a surface of the high concentration n-layer 34 which is on the side opposite to the side into which electrons are made incident, an n-electrode 36 which is electrically connected to the high concentration n-layer 34 is formed annularly. On the surface of the high concentration n-layer 34 which is on the side opposite to the side into which electrons are made incident, a silicon oxide film 37 is formed so as to cover an outer region of the n-electrode 36.

The APD 30 is electrically connected and also fixed to a wiring 39 of an interposer substrate 38 which is disposed on the stem 21 via a plurality of annularly disposed bumps 41. A plurality of lead pins 43, 44 penetrate through the stem 21 via an insulating member 42 made of glass or the like. The lead pin 43 is a pin for applying a reverse bias voltage and electrically connected to the p-electrode 35 of the APD 30 via a wire 45. The lead pin 44 is a pin for outputting a signal and electrically connected to the wiring 39 of the interposer substrate 38 via the wire 45. An outer end of the lead pin 43 is connected to a terminal of the bleeder substrate 17 for applying the reverse bias voltage via the opening 12 on the bottom wall 2d of the chamber 2 and the opening 13 of the insulating member 8. An outer end of the lead pin 44 is connected to a terminal of the bleeder substrate 17 for outputting a signal via the opening 12 and the opening 13.

Further, a lead pin 46 penetrates through the stem 21. The lead pin 46 is directly fixed to the stem 21 not via the insulating member 42. That is, the lead pin 46 is electrically connected to the stein 21. On the other hand, since the lead pins 43, 44 are fixed to the stem 21 via the insulating member 42, the lead pins 43, 44 are electrically insulated from the stem 21. The lead pin 46 is a pin for connecting the stein 21 with a ground potential. An outer end of the lead pin 46 is connected to a ground potential terminal of the bleeder substrate 17 via the opening 12 on the bottom wall 2d of the chamber 2 and the opening of the insulating member 8. In the ion detector 1A of the present embodiment, since the stem 21 is directly fixed to the chamber 2, the stem 21 is connected to the ground potential. Therefore, the lead pin 46 may be disposed on the stein 21, whenever necessary. According to a configuration where the lead pin 46 is disposed, it is possible to connect more reliably the stem 21 with the ground potential. On the other hand, according to a configuration where the lead pin 46 is not disposed, it is possible to simplify the structure of the ion detector 1A.

The above-configured ion detector 1A is mounted at a predetermined position inside a device (inside a mass spectrometer or the like) which is vacuumed, thereby detecting positive ions. In this case, in the ion detector 1A, the chamber 2 is grounded and kept at 0 V. At this time, the stem 21 is jointed to the bottom wall 2d of the chamber 2 and also the lead pin 46 for grounding is installed on the stem 21. Therefore, the stem 21 is also kept at 0 V. While the chamber 2 and the stem 21 are kept at 0 V, a negative potential (for example, −10 kV) is applied to the CD 9. Further, in the APD 30, while the n-electrode 36 is kept at 0 V via the lead pin 44, a negative potential (for example, −400 V) is applied to the p-electrode 35 as a reverse bias voltage via the lead pin 43.

When positive ions enter into the chamber 2 via the ion entrance 3 in this state, the positive ions travel toward the CD 9 to which a negative potential (for example, −10 kV) has been applied and collide with the CD 9. When secondary electrons are emitted from the CD 9 by the positive ion collisions, the secondary electrons are made incident into the electron incident surface 30a of the APD 30 and detected by the APD 30. More specifically, the secondary electrons emitted from the CD 9 are directly made incident into the electron incident surface 30a of the APD 30 without penetrating through a member such as a mesh. If a difference in potential (accelerating voltage) between the CD 9 and the stem 21 is, for example, 10 kV, the energy of electrons which are made incident into the APD 30 is 10 keV. At this time, in the APD 30, about 2,000 electron-hole pairs are produced from one electron made incident into the silicon substrate 31 (a gain of about 2,000 times). Further, a gain of about 50 times (a total gain of about 100,000 times) is obtained at the p-layer 33 and the high concentration n-layer 34, each of which is an avalanche layer.

In this ion detector 1A, since the electron incident surface 30a is located closer to the CD 9 than the positioning part 14 which supports the APD 30 having the electron incident surface 30a, a distance between the CD 9 and the electron incident surface 30a is shortened to a greater extent. Therefore, it is possible to increase the convergent property of secondary electrons emitted from the CD 9. Further, the secondary electrons are increased in convergent property, thus making it possible to reduce an area of the electron incident surface 30a for accepting the secondary electrons and downsize the APD 30. The downsized APD 30 is able to increase response characteristics of the APD 30 and also decrease noise. Thereby, the ion detector 1A is able to improve the detection accuracy.

Further, the stem 21 is electrically connected to the chamber 2 which is to be grounded. Thereby, it is possible to electrically stabilize the chamber 2 and the stem 21.

Second Embodiment

Figure 3:
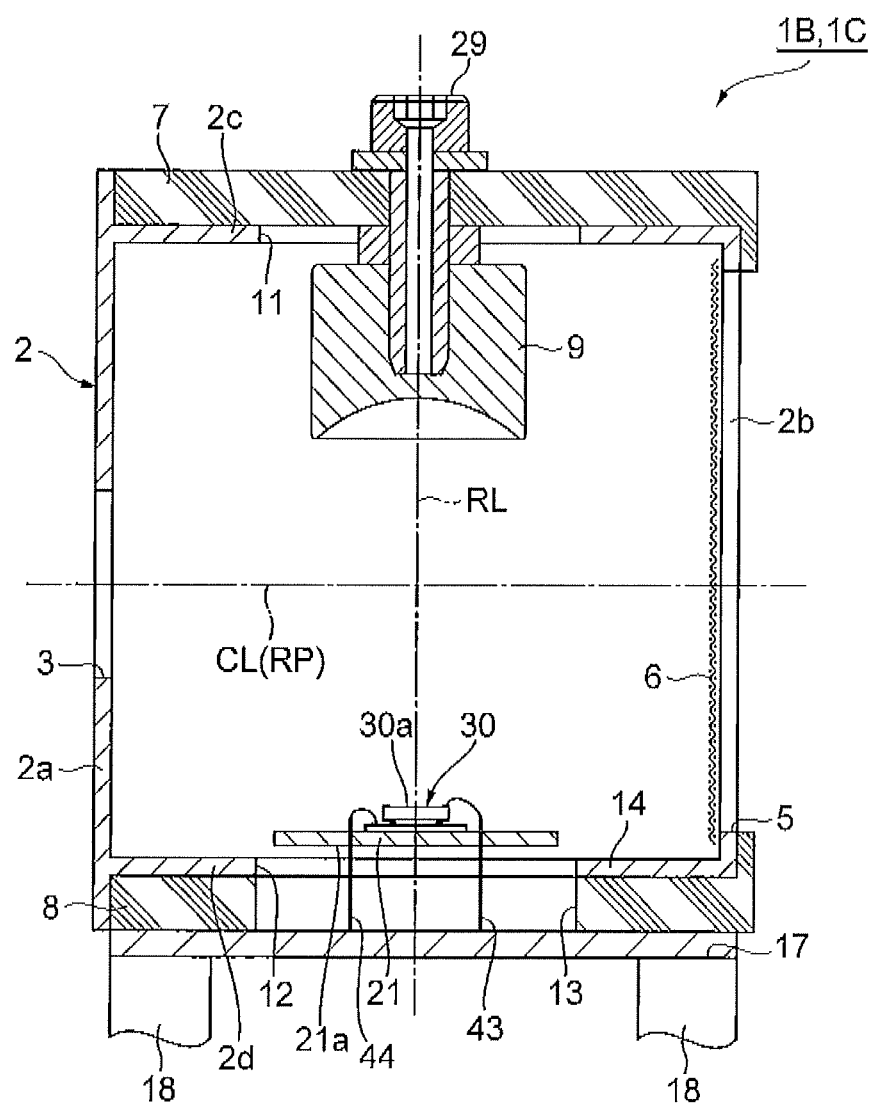
FIG. 3 is a longitudinal sectional view of an ion detector of a second embodiment and that of a third embodiment in the present invention.
Figure 4:
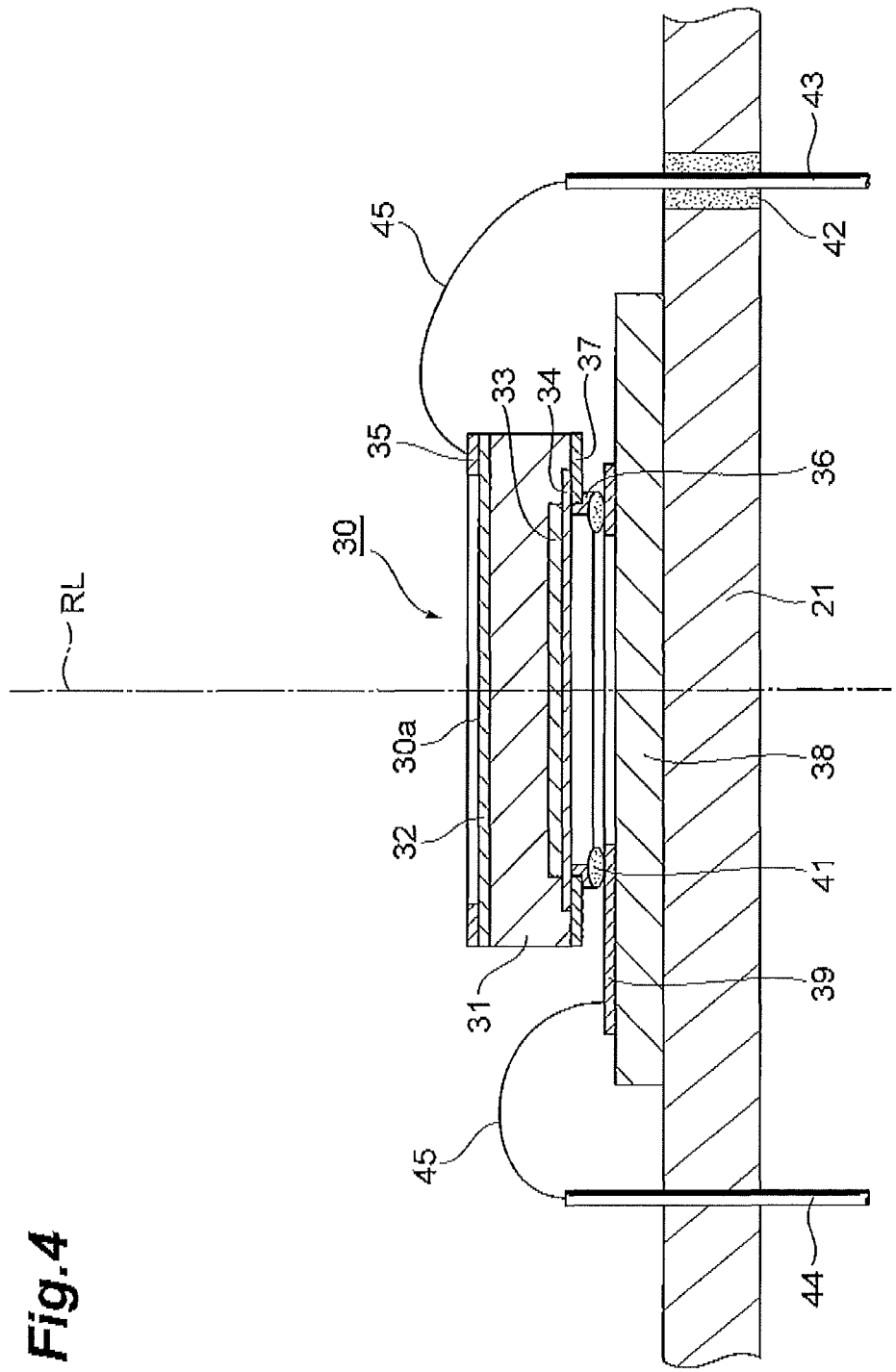
FIG. 4 is an enlarged view which shows the ion detector of the second embodiment in a state of being electrically connected to an avalanche photodiode.

Next, a description will be given of the ion detector of the second embodiment. FIG. 3 is a longitudinal sectional view of the ion detector of the second embodiment and that of the third embodiment in the present invention. FIG. 4 is an enlarged view which shows the ion detector of the second embodiment in a state of being electrically connected to an avalanche photodiode.

An ion detector 1B of the second embodiment is different from the ion detector 1A in that a stem 21 is not directly in contact with a chamber 2 and electrically insulated from the chamber 2 (refer to FIG. 3). Further, the ion detector 1B is different from the ion detector 1A in that a lead pin 44 is electrically connected to the stem 21 (refer to FIG. 4).

As shown in FIG. 3, the stem 21 is disposed in the chamber 2 of the ion detector 1B. The stem 21 has an external shape which is smaller than a diameter of an opening 12 installed on a bottom wall 2d of the chamber 2 and that of an opening 13 installed on an insulating member 8. The stem 21 is disposed inside the chamber 2 in such a manner that a back surface 21a of the stem 21 is located further inside than the bottom wall 2d of the chamber 2. The stem 21 is supported by lead pins 43, 44. Here, a part which supports the APD 30 in the grounded chamber 2 is the bottom wall 2d of the chamber 2. The bottom wall 2d of the chamber 2 indirectly supports the APD 30 via the insulating member 8, a bleeder substrate 17, the lead pins 43, 44 and the stem 21.

As shown in FIG. 4, the lead pin 44 is directly fixed to the stem 21 and thereby electrically connected to the stem 21. The lead pin 44 is a pin which is electrically connected to an n-electrode 36. Therefore, the stem 21 electrically connected to the lead pin 44 becomes equal in potential to the n-electrode.

This ion detector 1B electrically connects the lead pin 44 and the stem 21. Since the above-described configuration eliminates the need for a lead pin 46 for grounding the stem 21, it is possible to reduce the number of lead pins installed on the stem 21. Therefore, the ion detector 1B can be simplified in structure.

Further, a potential of the stem 21 is electrically insulated from a ground potential of the chamber 2. It is, therefore, possible to decrease an influence of noise which may be mixed from the chamber 2.

Third Embodiment

Figure 5:
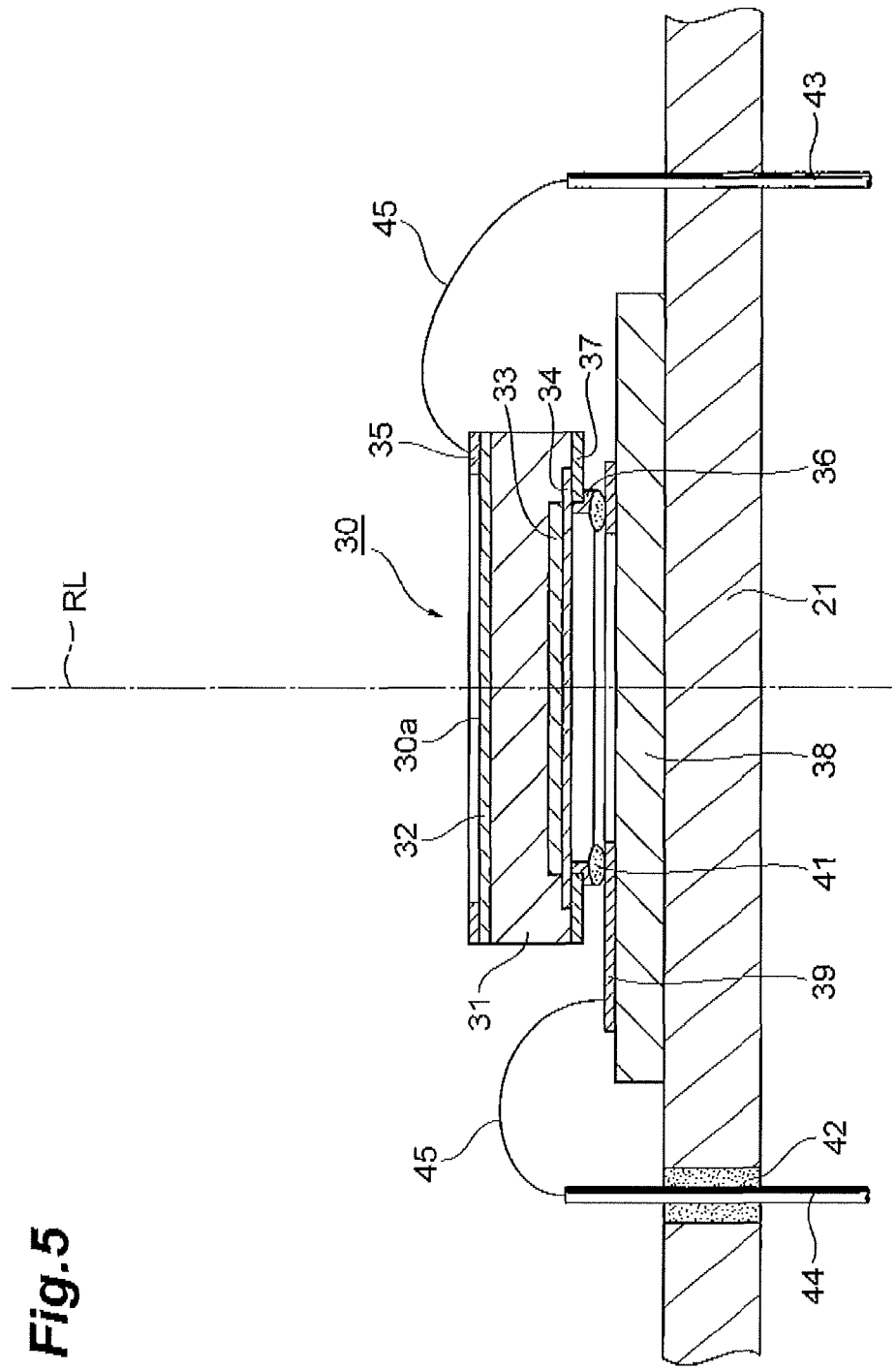
FIG. 5 is an enlarged view which shows the ion detector of the third embodiment in a state of being electrically connected to an avalanche photodiode.

Next, a description will be given of the ion detector of the third embodiment. FIG. 5 is an enlarged view which shows the ion detector of the third embodiment which is in a state of being electrically connected to an avalanche photodiode.

An ion detector 1C of the third embodiment is different from the ion detector 1A in that a stem 21 is electrically insulated from a chamber 2 (refer to FIG. 3). The ion detector 1C is also different from the ion detector 1B in that a lead pin 43 is electrically connected to the stem 21 (refer to FIG. 5).

The lead pin 43 is directly fixed to the stein 21 and thereby electrically connected to the stem 21. The lead pin 43 is a pin which is connected to a p-electrode 35. Therefore, the stem 21 which is electrically connected to the lead pin 43 becomes equal in potential to the p-electrode.

According to the ion detector 1C, as with the ion detector 1B of the second embodiment, a potential of the stem 21 is electrically insulated from a ground potential of the chamber 2. Therefore, it is possible to decrease an influence of noise which may be mixed from the chamber 2.

Fourth Embodiment

Figure 6:
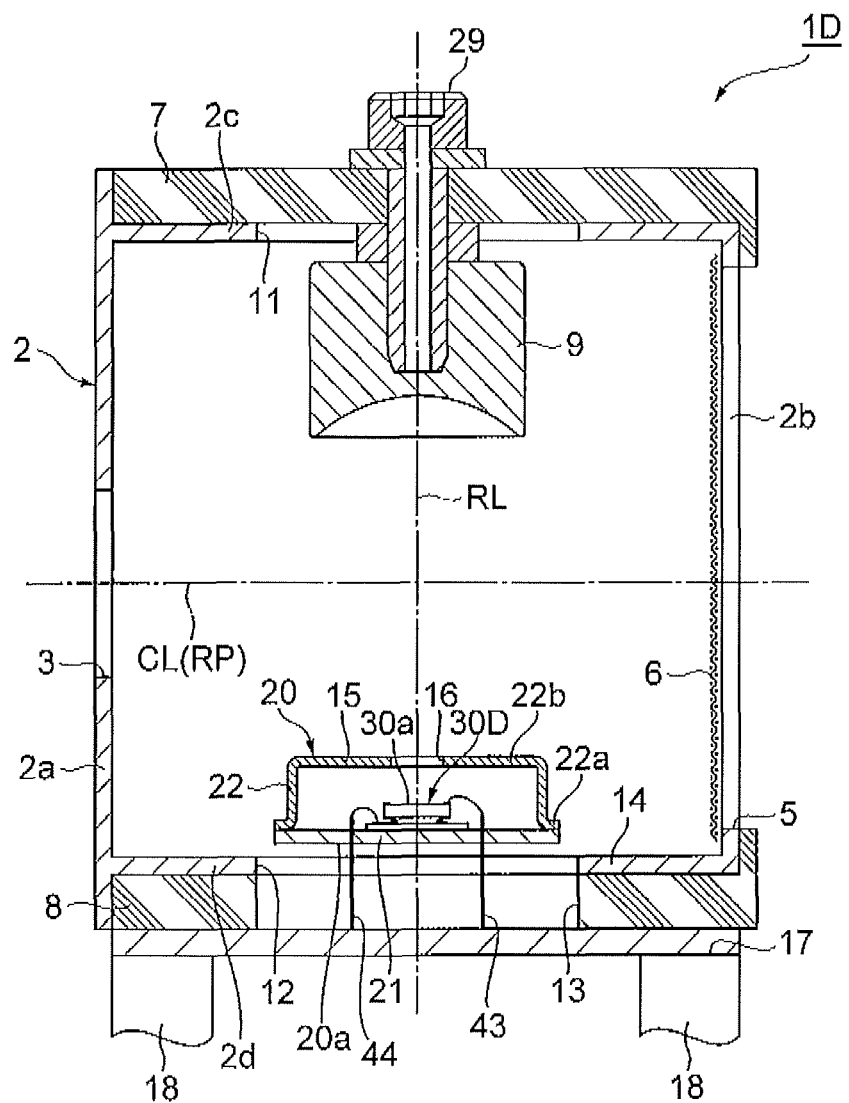
FIG. 6 is a longitudinal sectional view of an ion detector of a fourth embodiment of the present invention.
Figure 7:
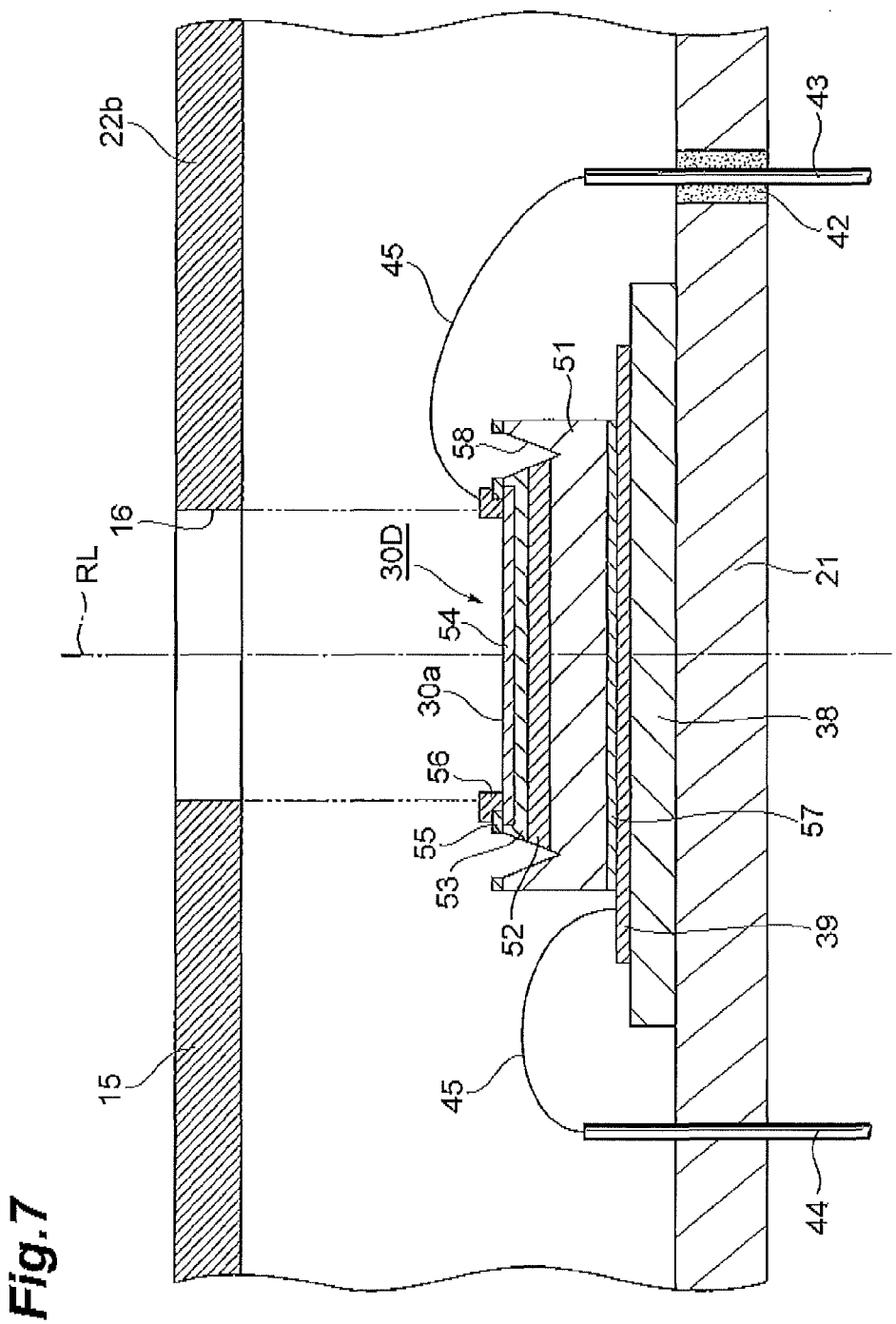
FIG. 7 is an enlarged view which shows the ion detector of the fourth embodiment in a state of being electrically connected to an avalanche photodiode.

Next, a description will be given of the ion detector of the fourth embodiment. FIG. 6 is a longitudinal sectional view of the ion detector of the fourth embodiment of the present invention. FIG. 7 is an enlarged view which shows the ion detector of the fourth embodiment in a state of being electrically connected to an avalanche photodiode.

An ion detector 1D of the fourth embodiment is different from the ion detector 1A in that a stem 21 is electrically insulated from a chamber 2. The ion detector 1D is also different from the ion detector 1A to 1C in that a cap 22 is installed on the stem 21 (refer to FIG. 6). Further, the ion detector 1D is different from the ion detector 1A in that a lead pin 44 is electrically connected to the stem 21. Still further, the ion detector 1D is different from the ion detector 1A in that in place of a back-illuminated type APD 30, a front-illuminated type APD 30D is used (refer to FIG. 7).

As shown in FIG. 6, a package 20 is disposed in the chamber 2 of the ion detector 1D. The package 20 is supported inside the chamber 2 by lead pins 43, 44. More specifically, the package 20 is disposed in the chamber 2 in such a manner that a back surface 21a of the stem 21 is located closer to the CD 9 than a bottom wall 2d of the chamber 2. Here, in the grounded chamber 2, a part which supports the APD 30D is a bottom wall 2d of the chamber 2. The bottom wall 2d of the chamber 2 supports indirectly the APD 30D via an insulating member 8, a bleeder substrate 17, lead pins 43, 44 and the stem 21.

The package 20 is provided with the stem 21 and the cylindrical cap 22 made of SUS. An end of the cap 22 on the side of the stem 21 is given as an outward flange 22a, while an end of the cap 22 on the side opposite to the stem 21 is given as an inward flange 22b. An external shape of the cap 22 is substantially similar to that of the stem 21. The package 20 is disposed in the chamber 2 in such a manner that a back surface 20a of the stem 21 is located further inside than the bottom wall 2d of the chamber 2. In the cap 22 of the package 20, an inner region of the inward flange 22b of the cap 22 functions as an electron passage port 16 having a circular shape in section (for example, about 3 mm in diameter) through which secondary electrons traveling from the CD 9 to the APD 30D pass. An electron incident surface 30a includes the electron passage port 16, when viewed from a direction in which the CD 9 is opposed to the electron incident surface 30a (refer to the alternate long and two short dashed lines in FIG. 7). As with the APD 30D, the cap 22 is a member which is supported via the stem 21 by the insulating member 8, the bleeder substrate 17 and the lead pins 43, 44. Therefore, the cap 22 does not correspond to the part which supports the APD 30D.

As shown in FIG. 7, the APD 30D is a front-illuminated type semiconductor electron detector. The APD 30D is provided with a high concentration n-type silicon substrate 51 in the shape of a rectangular plate. An n-layer 52 and a p-layer 53 are formed in this order on a surface layer of the silicon substrate 51 which is on the side into which electrons are made incident, thereby realizing a pn joint. That is, in the APD 30D, the pn joint part is located on the side into which electrons are made incident. Further, a high concentration p-type silicon layer 54 is formed on the p-layer 53. Still further, a oxide silicon film 55 is annularly formed on the p-layer 53 and the high concentration p-type silicon layer 54. Then, a p-electrode 56 which is electrically connected to the high concentration p-type silicon layer 54 is annularly formed on the high concentration p-type silicon layer 54 and the oxide silicon film 55. In the APD 30D, a surface of the high concentration p-type silicon layer 54 which is exposed from the inner region of the p-electrode 56 to the side into which electrons are made incident is given as an electron incident surface 30a. An n-electrode 57 is formed on the surface layer of the silicon substrate 51 which is on the side opposite to the side into which electrons are made incident. The n-electrode 57 is electrically connected to a wiring 39 of an interposer substrate 38. Further, a groove 58 which surrounds the oxide silicon film 55 is formed in the APD 30D. The groove 58 has such a depth that passes through the p-layer 53 and the n-layer 52 and reaches the high concentration n-type silicon substrate 51. The groove 58 is able to raise withstanding pressure at the pn joint part. In the APD 30D, when electrons are made incident into the electron incident surface 30*a*, electron-hole pairs are produced on the high concentration p-type silicon layer 54 and the p-layer 53. The produced electrons are multiplied on a boundary surface (avalanche layer) of the pn joint part and output accordingly.

The lead pin 43 is electrically connected via a wire 45 to the p-electrode 56 of the APD 30D. The lead pin 44 is electrically connected via the wire 45 to the wiring 39 of the interposer substrate 38. The lead pin 44 is directly fixed to the stem 21, by which it is electrically connected to the stem 21. The lead pin 44 is a pin which is connected to the n-electrode 57. Therefore, the stem 21 electrically connected to the lead pin 44 becomes equal in potential to the n-electrode 57. Further, the cap 22 which is fixed to the stem 21 becomes equal in potential to the stem 21, that is, becomes equal in potential to an n-electrode 36. To the n-electrode 36, 0 V is applied via the lead pin 44. Therefore, the stem 21 and the cap 22 become 0 V in potential.

The ion detector 1D is provided with the cap 22. Therefore, it is possible to suppress deterioration of the APD 30D due to secondary electron collisions with sites other than the electron incident surface 30*a* in the APD 30D.

Fifth Embodiment

Figure 8:
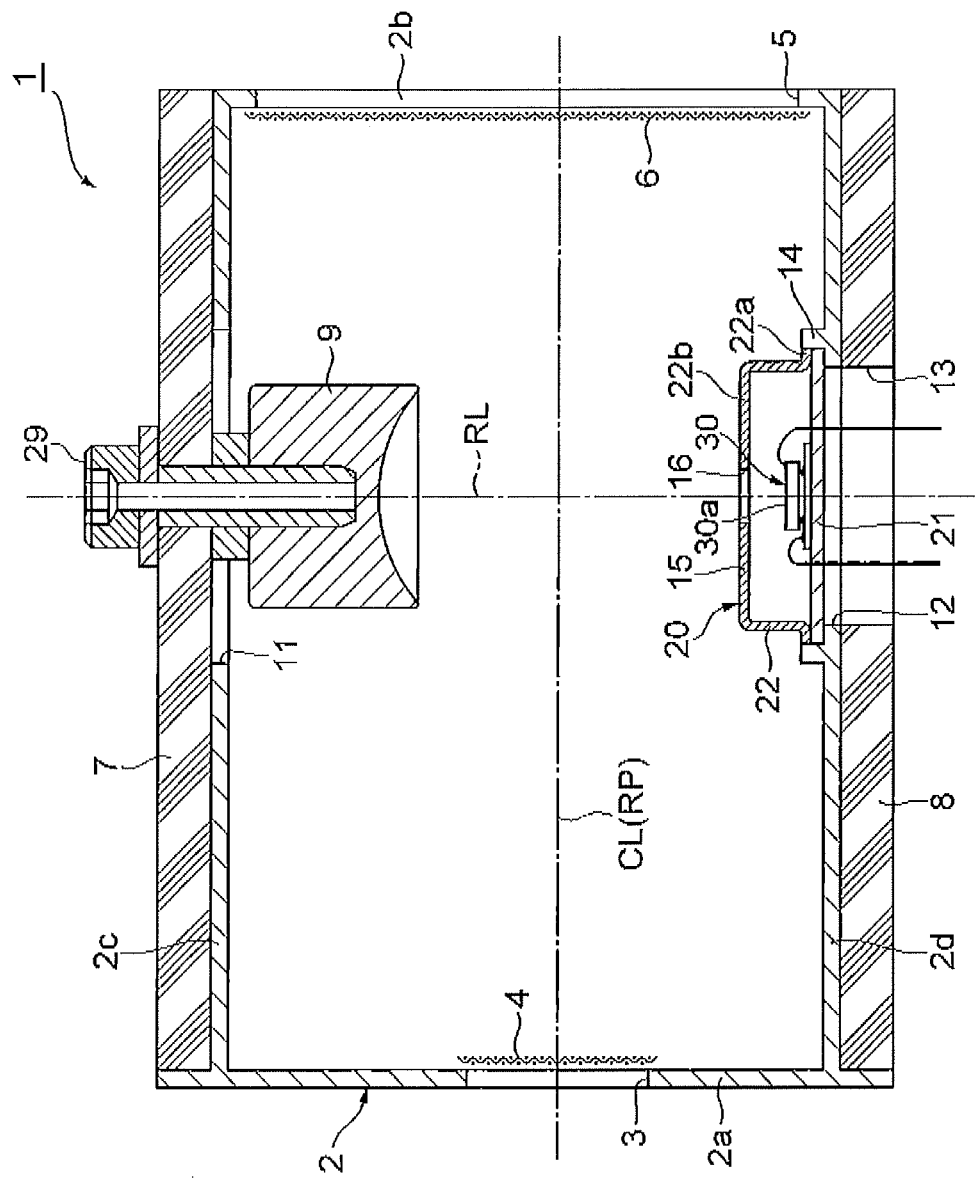
FIG. 8 is a longitudinal sectional view of an ion detector of a fifth embodiment of the present invention.
Figure 9:
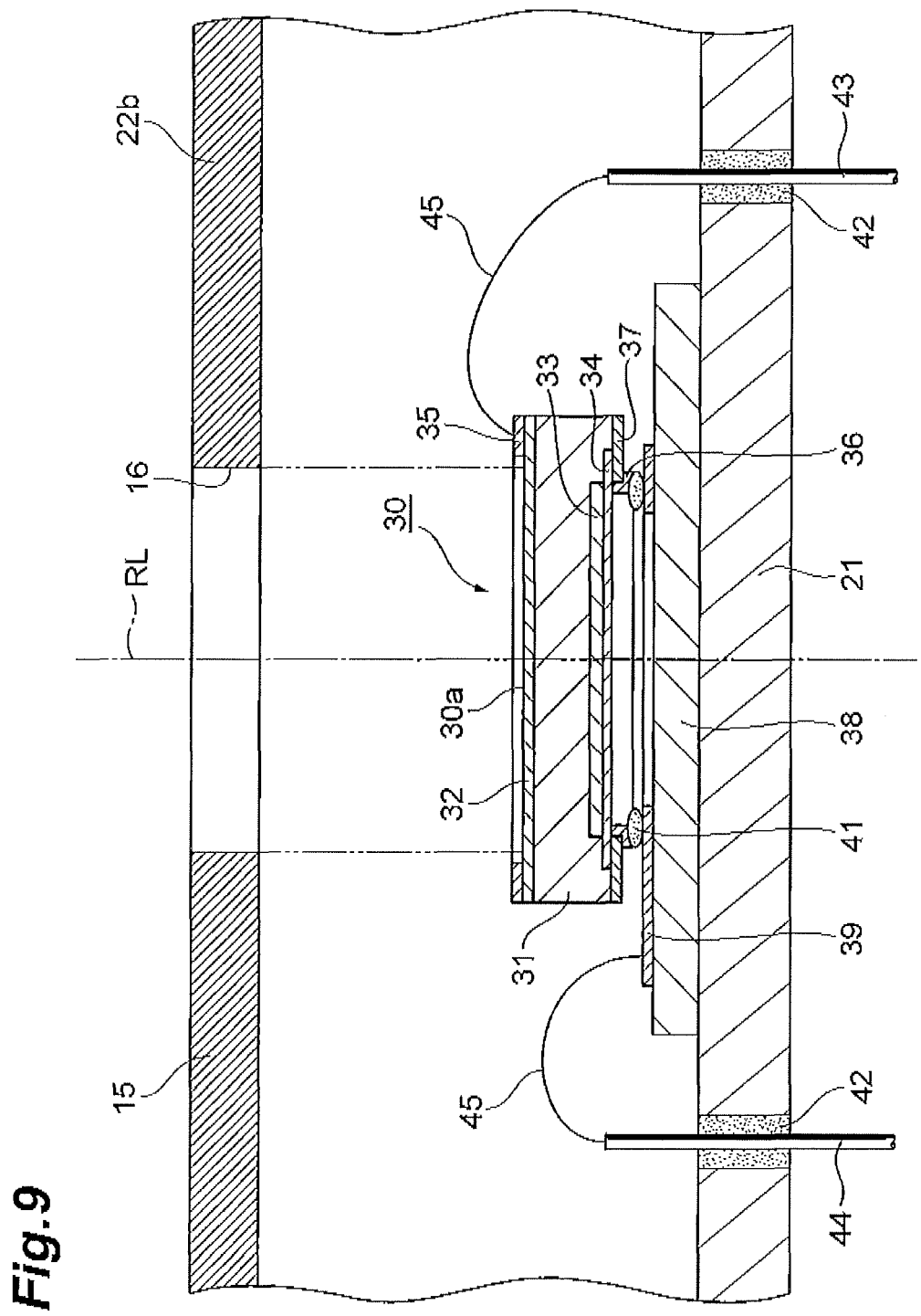
FIG. 9 is an enlarged view which shows the ion detector of the fifth embodiment in a state of being electrically connected to an avalanche photodiode.

Next, a description will be given of the ion detector of the fifth embodiment. FIG. 8 is a longitudinal sectional view of the ion detector of the fifth embodiment of the present invention. FIG. 9 is an enlarged view which shows the ion detector of the fifth embodiment in a state of being electrically connected to an avalanche photodiode.

As shown in FIG. 8, an ion detector 1 of the fifth embodiment is provided with a rectangular parallelepiped box-shaped chamber (housing) 2 which is made of SUS (stainless steel). An ion entrance 3 having a circular shape in section (for example, about 10 mm in diameter) for allowing positive ions to enter is installed on a side wall 2*a* of the chamber 2. A mesh (first mesh) 4 made of SUS is placed at the ion entrance 3 so as to run along an inner surface of the side wall 2*a*. On a side wall 2*b* of the chamber 2 opposed to the side wall 2*a*, an opening 5 which includes the ion entrance 3 is installed, when viewed from a direction in which the side wall 2*a* is opposed to the side wall 2*b*. A mesh 6 made of SUS is placed at the opening 5 so as to run along an inner surface of the side wall 2*b*. An insulating member 7 made of a PEEK (polyether ether ketone) resin is disposed on an outer surface of a top wall 2*c* of the chamber 2. An insulating member 8 made of a PEEK resin is disposed on an outer surface of a bottom wall 2*d* of the chamber 2.

A cylindrical conversion dynode 9 (for example, about 12 mm in diameter) made of SUS (hereinafter, referred to as "CD 9") is disposed in the chamber 2. The CD 9 is fixed to the insulating member 7 with a screw 29 or the like via an opening 11 installed on the top wall 2*c* of the chamber 2. Further, an avalanche photodiode 30 (hereinafter referred to as "APD 30") is disposed in the chamber 2 in a state of being housed in a package 20. An opening 12 and an opening 13 are installed in a continuous manner respectively on the bottom wall 2*d* of the chamber 2 and the insulating member 8. The opening 12 and the opening 13 are blocked from inside the chamber 2 by the package 20.

The package 20 is provided with the stem 21 which is in the shape of a circular plate and made of Kovar and a cylindrical cap 22 made of SUS. An end of a cap 22 on the side of the stem 21 is given as an outward flange 22*a*, while an end of the cap 22 on the side opposite to the stem 21 is given as an inward flange 22*b*. An annular positioning part 14 is installed integrally on an inner surface of the bottom wall 2*d* of the chamber 2 so as to project from the inner surface thereof. A joint part of an outer edge of the stem 21 with the outward flange 22*a* of the cap 22 is hermetically jointed to the bottom wall 2*d* in a state of being fitted into the positioning part 14.

The APD 30 is provided with an electron incident surface 30*a* which is opposed to the CD 9 and into which secondary electrons emitted from the CD 9 are made incident. On the other hand, the cap 22 of the package 20 functions as a cover electrode 15. An inner region of the inward flange 22*b* of the cap 22 functions as an electron passage port 16 having a circular shape in section (for example, about 3 mm in diameter) through which secondary electrons traveling from the CD 9 to the APD 30 pass. That is, a part of the package 20 which houses the APD 30 is given as the cover electrode 15 which is disposed in the chamber 2. The electron incident surface 30*a* includes the electron passage port 16, when viewed from a direction in which the CD 9 is opposed to the electron incident surface 30*a* (refer to the alternate long and two short dashed lines in FIG. 9).

Here, a reference line RL which connects a center point of the CD 9 with a center point of the electron incident surface 30*a* of the APD 30 is substantially orthogonal to a center line CL of the ion entrance 3. In other words, when a predetermined plane which is substantially orthogonal to the reference line RL and also includes the center line CL is given as a reference plane RP, the CD 9 and the electron incident surface 30*a* of the APD 30 are positioned with respect to the ion entrance 3 in such a manner that the reference plane RP substantially orthogonal to the reference line RL includes the center line CL. In the CD 9, a recessed curved surface which is opposed to the electron incident surface 30*a* is, for example, about 8.5 mm in curvature radius. And, a distance between a bottom of the recessed curved surface and the electron passage port 16 of the cover electrode 15 (distance along the reference line RL) is, for example, about 20 mm.

As shown in FIG. 9, the APD 30 is provided with a low concentration p-type silicon substrate 31 in the shape of a rectangular plate. On a surface layer of the silicon substrate 31 which is on the side into which electrons are made incident, there is formed a high concentration p-layer 32. On a surface layer of the silicon substrate 31 which is on the side opposite to the side into which electrons are made incident, a p-layer 33 and a high concentration n-layer 34 are formed in this order from the side into which electrons are made incident, thereby realizing a pn joint. On a surface of the high concentration p-layer 32 which is on the side into which electrons are made incident, there is annularly formed a p-electrode 35 which is electrically connected to the high concentration p-layer 32. In the APD 30, the surface of the high concentration p-layer 32 which is exposed from an inner region of the p-electrode 35 to the side into which electrons are made incident is given as the electron incident surface 30*a*. On the surface of the high concentration n-layer 34 which is on the side opposite to the side into which electrons are made incident, there is annularly formed an n-electrode 36 which is electrically connected to the high concentration n-layer 34. On the surface of the high concentration n-layer 34 which is on the side opposite to the side into which electrons are made incident, there is formed a silicon oxide film 37 so as to cover an outer region of the n-electrode 36.

The APD 30 is electrically connected and also fixed to a wiring 39 of an interposer substrate 38 disposed on the stem 21 via a plurality of annularly disposed bumps 41. A plurality of lead pins 43, 44 penetrate through the stem 21 via an insulating member 42 made of glass or the like. The lead pin 43 is a pin for applying a reverse bias voltage and electrically connected to the p-electrode 35 of the APD 30 via a wire 45. The lead pin 44 is a pin for outputting a signal and electrically connected to the wiring 39 of the interposer substrate 38 via the wire 45. An outer end of each of the lead pins 43, 44 extends outside the chamber 2 via an opening 12 on the bottom wall 2d of the chamber 2 and an opening 13 on the insulating member 8 (refer to FIG. 8).

The above-configured ion detector 1 is mounted at a predetermined position, for example, inside a device (inside a mass spectrometer or the like) which is vacuumed, thereby detecting positive ions. In this case, in the ion detector 1, the chamber 2 is grounded and kept at 0 V. At this time, since the package 20 is jointed to the bottom wall 2d of the chamber 2, a cover electrode 15 electrically connected to the chamber 2 is also kept at 0 V. While the chamber 2 and the cover electrode 15 are kept at 0 V, a negative potential (for example, −200 V) is applied to a mesh 4. Further, while the chamber 2 and the cover electrode 15 are kept at 0 V, a negative potential (for example, −10 kV) is applied to the CD 9. Still further, in the APD 30, while the n-electrode 36 is kept at 0 V via the lead pin 44, a negative potential (for example, −400 V) is applied via the lead pin 43 to the p-electrode 35 as a reverse bias voltage.

When positive ions enter into the chamber 2 via the ion entrance 3 and the mesh 4 to which a negative potential (for example, −200 V) has been applied in this state, the positive ions travel toward the CD 9 to which a negative potential (for example, −10 kV) has been applied and collide with the CD 9. When secondary electrons are emitted from the CD 9 by the positive ion collisions, the secondary electrons are made incident into the electron incident surface 30a of the APD 30 via an electron passage port 16 of the cover electrode 15 kept at 0 V and detected by the APD 30. If a difference in potential (accelerating voltage) between the CD 9 and the cover electrode 15 is, for example, 10 kV, the energy of electrons made incident into the APD 30 is 10 keV. At this time, in the APD 30, about 2,000 electron-hole pairs are produced from one electron made incident into the silicon substrate 31 (a gain of about 2,000 times). Further, a gain of about 50 times (a total gain of about 100,000 times) is obtained at the p-layer 33 and the high concentration n-layer 34, each of which is an avalanche layer.

As described so far, in the ion detector 1, use of the APD 30 eliminates the need for a scintillator which converts secondary electrons to light, a light guide for guiding the light into a photoelectric multiplier or the like. It is thus possible to simplify the structure. Further, the APD 30 is lower in multiplication fluctuation and greater in the number of detectable ions, for example, compared with a photoelectric multiplier, thus making it possible to improve an S/N ratio and also enlarge a D range. Therefore, according to the ion detector 1, it is possible to improve the detection accuracy and simplify the structure.

Regarding the above-described improvement in an S/N ratio, the APD 30 is lower in multiplication fluctuation, for example, compared with a photoelectric multiplier and therefore also able to discriminate the number of electrons converted by the CD 9 with reference to a crest value of an output signal. Thereby, it is possible to tell whether collisions are made with ions greater in mass (ions lower in the number of electrons produced by the CD 9) or with ions smaller in mass. This results in effects of reducing noise in a mass spectrometer. Where ions smaller in mass are scanned inside a mass spectrometer or the like, a pulse lower in wave height becomes noise and a pulse higher in wave height becomes a signal. On the other hand, where ions greater in mass are scanned in a mass spectrometer or the like, a pulse lower in wave height becomes a signal and a pulse higher in wave height becomes noise.

Further, regarding the above-described enlargement of the D range, where the number of ions which have entered into the chamber 2 via the ion entrance 3 is great, the APD 30 is able to output more electric current, for example, compared with a photoelectric multiplier. On the other hand, where the number of ions which have entered into the chamber 2 via the ion entrance 3 is small, it is also possible to count the number of ions, for example, as with a photoelectric multiplier.

Still further, in the ion detector 1, the electron incident surface 30a of the APD 30 includes the electron passage port 16 of the cover electrode 15, when viewed from a direction in which the CD 9 is opposed to the electron incident surface 30a (that is, a direction parallel to the reference line RL). Thereby, it is possible to suppress deterioration of the APD 30 due to secondary electron collisions with sites other than the electron incident surface 30a in the APD 30.

Still further, a part of the package 20 which houses the APD 30 (more specifically, the inward flange 22b of the cap 22) is given as the cover electrode 15. Thus, the part of the package 20 is effectively used as the cover electrode 15, which also contributes to structural simplification of the ion detector 1.

Still further, the cover electrode 15 is electrically connected to the chamber 2 which is to be grounded. Thereby, it is possible to electrically stabilize the chamber 2 and the cover electrode 15.

In addition, the mesh 4 to which a negative potential is applied is placed at the ion entrance 3. It is, thereby, possible to suppress the formation of a positive electric field inside the ion entrance 3 and improve the incidence efficiency of positive ions in the CD 9.

In the ion detector 1, the APD 30 is downsized for the purpose of obtaining favorable time characteristics. Thus, in such a manner that secondary electrons can be converged to the smallest possible extent, a recessed curved surface of the CD 9 is decreased in curvature radius to increase the magnification as a lens. And, a distance between the CD 9 and the APD 30 is shortened.

Further, in the ion detector 1, the opening 5 is installed at a position opposite to the ion entrance 3, and a mesh 6 placed inside the opening 5 is kept at 0 V. Thereby, an electrostatic lens which is converged to the CD 9 and the electron incident surface 30a of the APD 30 is formed to prevent the occurrence of noise due to neutrality or the like.

Figure 10:
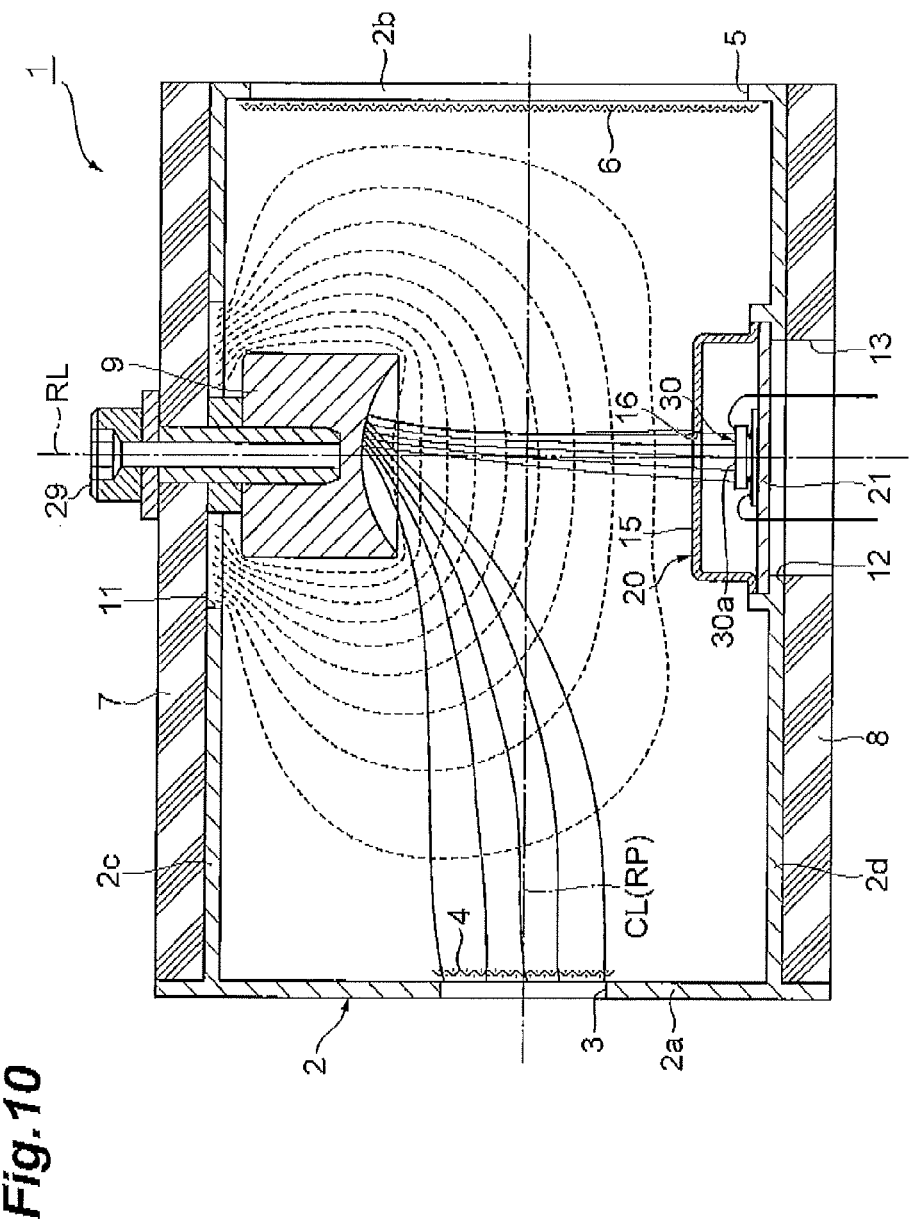
FIG. 10 is a longitudinal sectional view of the ion detector where an equipotential surface as well as ion and secondary electron trajectories are shown.

Next, a description will be given of analysis results on the incidence efficiency of positive ions in the CD 9, the incidence efficiency of secondary electrons on the electron incident surface 30a of the APD 30 and the detection efficiency of positive ions in the ion detector 1. The analysis results shown in FIG. 10 were obtained from the above-described ion detector 1. In FIG. 10, broken lines indicated across the inside of the chamber 2 depict a negative equipotential surface, solid lines from the ion entrance 3 to the CD 9 depict positive ion trajectories, and solid lines from the CD 9 to the electron incident surface 30a of the APD 30 depict secondary electron trajectories. At this time, while the chamber 2 and the cover electrode 15 were kept at 0 V, −200 V was applied to the mesh 4, and −10 kV was applied to the CD 9. Further, in the APD 30, while the n-electrode 36 was kept at 0 V, −400 V was applied to the p-electrode 35.

As a result, the incidence efficiency of positive ions in the CD 9 was 99.2%, the incidence efficiency of secondary electrons on the electron incident surface 30a of the APD 30 was 99.0%, and, the detection efficiency of positive ions in the ion detector 1 was 99.2%. As described above, in the ion detector 1, obtained were extremely favorable analysis results that all the incidence efficiency and the detection efficiency exceeded 99%. The incidence efficiency of positive ions in the CD 9 is a ratio of "positive ions which have reached the CD 9" to "positive ions which have entered into the chamber 2 via the ion entrance 3." The incidence efficiency of secondary electrons on the electron incident surface 30a of the APD 30 is a ratio of "secondary electrons which have reached the electron incident surface 30a" to "secondary electrons which have been emitted from the CD 9." The detection efficiency of positive ions in the ion detector 1 is a ratio of "secondary electrons which have reached the electron incident surface 30a" to "positive ions which have entered into the chamber 2 via the ion entrance 3."

A description has been so far given of one embodiment of the present invention, to which the present invention shall not be, however, limited. For example, components of the ion detector 1 are not limited to the shapes and materials described above but available in various shapes and materials. Further, the cover electrode 15 which has the electron passage port 16 may not be a part of the package 20 but may be provided in separation from the package 20.

Further, the other mesh (second mesh) may be placed at the ion entrance 3 so as to be located outside with respect to the mesh 4, and a positive potential (for example, +20 V) may be applied to the other mesh so as to have an absolute value smaller than that of a potential which is applied to the mesh 4. According to this configuration, positive ions relatively low in energy are repulsed and only positive ions relatively high in energy are allowed to pass through the ion entrance 3. At this time, negative ions are repulsed by the mesh 4 to which a negative potential has been applied. The energies of positive ions to be noise are often lower than the energies of positive ions which are to be detected. Therefore, the positive ions relatively low in energy are prevented from entering into the chamber 2, thus making it possible to improve the S/N ratio of the ion detector 1. However, even if no mesh is placed at the ion entrance 3, it is possible to improve the S/N ratio and enlarge the D range in the APD 30, as compared with a conventional case.

Still further, a pair of electrode members which are to be equal in potential to the chamber 2 may be disposed in the chamber 2 so as to be located closer to the ion entrance 3 than the CD 9 and the electron incident surface 30a of the APD 30 and also so as to sandwich the ion entrance 3 in a direction substantially orthogonal to a direction in which the CD 9 is opposed to the electron incident surface 30a, when viewed from the ion entrance 3 side (that is, a direction parallel to the center line CL). According to the above-described configuration, even when the ion entrance 3 is formed so as to have a sectional shape taking as its longitudinal direction the direction in which, for example, the pair of electrode members are opposed, it is possible to converge positive ion trajectories to the CD 9 and improve the incidence efficiency of positive ions in the CD 9.

Sixth Embodiment

Figure 11:
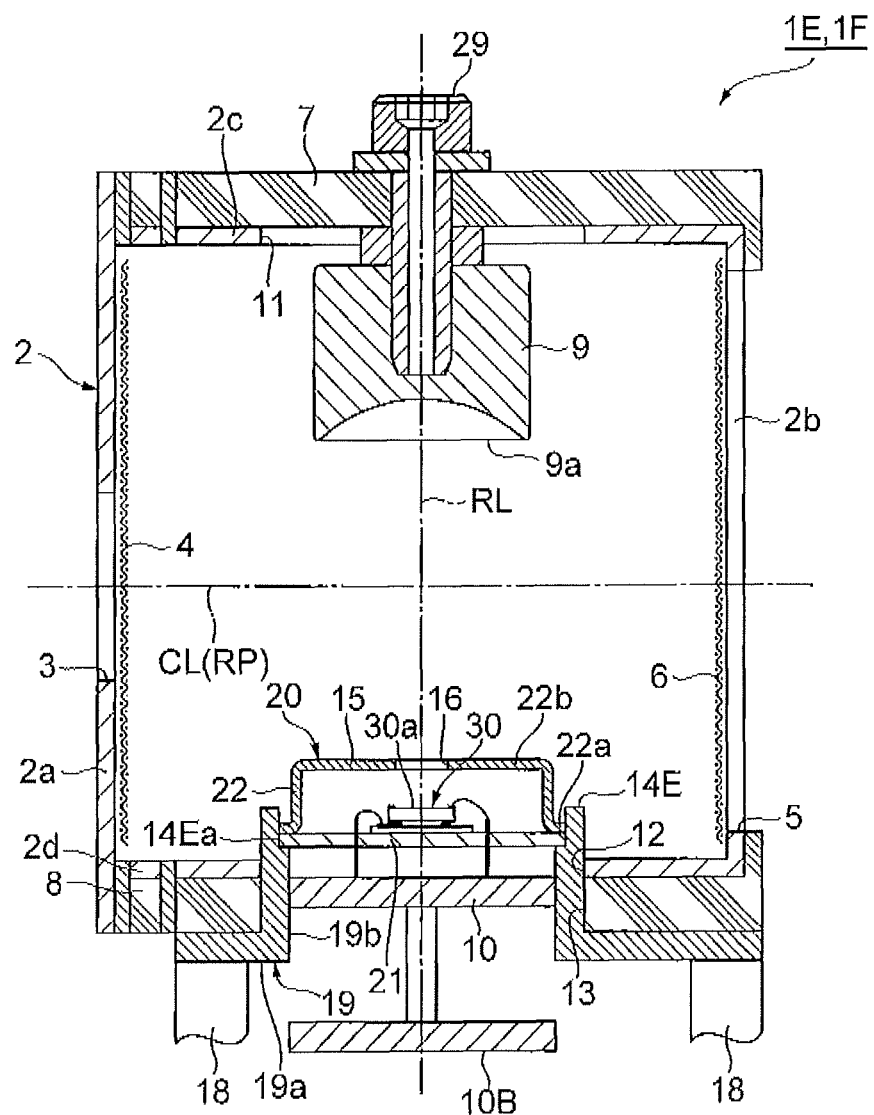
FIG. 11 is a longitudinal sectional view of an ion detector of a sixth embodiment and that of a seventh embodiment in the present invention.
Figure 12:
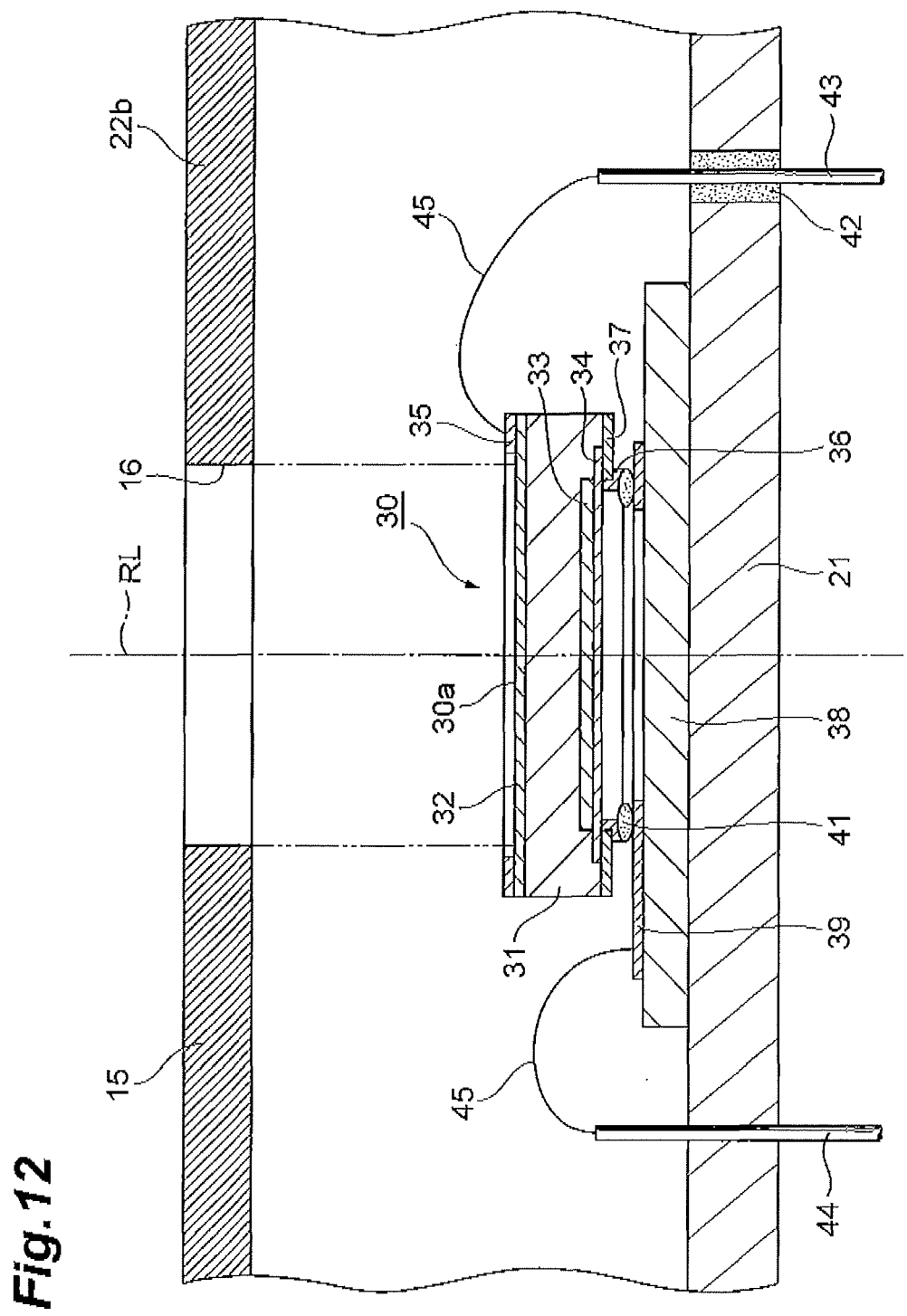
FIG. 12 is an enlarged view which shows the ion detector of the sixth embodiment in a state of being electrically connected to an avalanche photodiode.

Next, a description will be given of the ion detector of the sixth embodiment. FIG. 11 is a longitudinal sectional view of the ion detector of the sixth embodiment and that of the seventh embodiment in the present invention. FIG. 12 is an enlarged view which shows the ion detector of the sixth embodiment in a state of being electrically connected to an avalanche photodiode.

An ion detector 1E is different from the ion detector 1A of the first embodiment in that not only positive ions but also negative ions are detected. The ion detector 1E is different from the ion detector 1A in that a stem 21 is electrically insulated from a chamber 2 (refer to FIG. 11). The ion detector 1E is also different from the ion detector 1A in that a lead pin 44 is electrically connected to the stem 21 (refer to FIG. 12).

As shown in FIG. 11, a mesh (first mesh) 4 made of SUS is placed at an ion entrance 3 of the ion detector 1E so as to run along an inner surface of a side wall 2a. An opening 12 of the chamber 2 and an opening 13 of an insulating member 8 are blocked from outside the chamber 2 by a circuit substrate 10. The circuit substrate 10 is hermetically fixed inside the opening 13 of the insulating member 8. Further, in the ion detector 1E, a circuit substrate 10B is installed on the circuit substrate 10 via a spacer made of a PEEK resin.

A package 20 is disposed in the chamber 2 and supported on the circuit substrate 10 in a state of being electrically insulated from the chamber 2. More specifically, the ion detector 1E is provided with an insulating member 19 made of a PEEK resin. The insulating member 19 is provided with a base part 19a disposed on an outer surface of the insulating member 8 and an upright part 19b disposed along inner walls of the opening 12 and the opening 13. One end of the upright part 19b installed standing from the base part 19a extends to the inside of the chamber 2. A positioning part 14E for supporting the package 20 is installed at one end of the chamber 2 on the inner side, and an outer edge of the stem 21 is hermetically jointed to a bottom wall 2d in a state of being fitted inside the positioning part 14E.

The positioning part 14E is provided with a supporting surface 14Ea which is in contact with a back surface 21a of the stem 21. The supporting surface 14Ea is located closer to the CD 9 than the bottom wall 2d of the chamber 2. The stem 21 which is disposed at the above-described positioning part 14E is located closer to the CD 9 than the bottom wall 2d of the chamber 2. Therefore, the electron incident surface 30a of the APD 30 disposed at the stem 21 is located closer to the CD 9 than a part which supports the APD 30 via the stem 21 in the grounded chamber 2. Here, in the grounded chamber 2, the part which supports the APD 30 is the bottom wall 2d of the chamber 2. The bottom wall 2d of the chamber 2 supports indirectly the APD 30 via the insulating members 8, 19 and the stem 21. The insulating member 19 is indirectly fixed to the chamber 2 but not equal in potential to the chamber 2. Therefore, the insulating member 19 does not correspond to the part which supports the APD 30 in the grounded chamber 2. Further, a cap 22 is a member supported via the stem 21, as with the APD 30. Therefore, the cap 22 does not correspond to the part which supports the APD 30.

Here, a detailed description will be given of the CD 9 disposed with respect to the package 20. A main surface 9a of the CD 9 which is opposed to the bottom wall 2d of the chamber 2 is kept away from a top wall 2c of the chamber 2 by 5 mm to 15 mm in a direction along a reference line RL. For example, the main surface 9a of the CD 9 is kept away from the top wall 2c of the chamber 2 by 12 mm. On the other hand, a flange 22b of the cap 22 which is opposed to the main surface 9a of the CD 9 is kept away from the bottom wall 2d of the chamber 2 by 5 mm to 15 mm in a direction along the reference line RL. For example, the flange 22b of the cap 22 is kept way from the bottom wall 2d of the chamber 2 by 12 mm. Therefore, in the present embodiment, a distance between the main surface 9a of the CD 9 and the flange 22b of the cap 22 is set to be 10 mm to 25 mm and for example, 19.5 mm.

As shown in FIG. 12, a lead pin 44 is fixed directly to the stem 21 and thereby electrically connected to the stem 21. The lead pin 44 is a pin which is electrically connected to an n-electrode 36. Therefore, the stem 21 which is electrically connected to the lead pin 44 becomes equal in potential to the n-electrode.

The above-configured ion detector 1E is mounted at a predetermined position inside a device (inside a mass spectrometer or the like) which is vacuumed, thereby detecting positive ions and negative ions. In this case, in the ion detector 1E, the chamber 2 is grounded and kept at 0 V. While the chamber 2 is kept at 0 V, a positive potential (for example, +200 V) and a negative potential (for example, -200 V) are selectively applied to a mesh 4. Further, while the chamber 2 is kept at 0 V, a negative potential (for example, -10 kV) is applied to the CD 9. Still further, in the APD 30, a positive potential (for example, +10 kV) is applied to the n-electrode 36 via the lead pin 44. At this time, a positive potential (+10 kV) is applied via the lead pin 44 to the package 20 (that is, the stem 21 and the cap 22 (a cover electrode 15)) which is electrically insulated from the chamber 2 kept at 0 V. In addition, a positive potential (for example, +9.6 kV) is applied as a reverse bias voltage to a p-electrode 35 via a lead pin 43.

Thereby, a negative equipotential surface formed by the CD 9 and a positive equipotential surface formed by the cover electrode 15 and the electron incident surface 30a of the APD 30 are substantially symmetrical with respect to a plane of a reference plane RP. That is, at least, a vicinity of intersection between the reference plane RP and the reference line RL (that is, a vicinity of intersection between the center line CL of the ion entrance 3 and the reference line RL) is to be substantially 0 V.

Where positive ions are detected by the ion detector 1E, a negative potential (for example, -200 V) is applied to the mesh 4. Then, when positive ions enter into the chamber 2 via the ion entrance 3 and the mesh 4 to which a negative potential (for example, -200 V) has been applied, the positive ions travel toward the CD 9 to which a negative potential (for example, -10 kV) has been applied and collide with the CD 9. When secondary electrons are emitted from the CD 9 by the positive ion collisions, the secondary electrons are made incident into the electron incident surface 30a of the APD 30 to which a positive potential (for example, +9.6 kV) has been applied via the electron passage port 16 of the cover electrode 15 to which a positive potential (for example, +10 kV) has been applied and detected by the APD 30. If a difference in potential (accelerating voltage) between the CD 9 and the cover electrode 15 is, for example, 20 kV, the energy of electrons made incident into the APD 30 is to be 20 keV. At this time, in the APD 30, about 4,000 electron-hole pairs are produced from one electron made incident into the silicon substrate 31 (a gain of about 4,000 times). Further, a gain of about 50 times (a total gain of about 200,000 times) is obtained at the p-layer 33 and the high concentration n-layer 34, each of which is an avalanche layer.

On the other hand, where negative ions are detected by the ion detector 1E, a positive potential (for example, +200 V) is applied to the mesh 4. Then, when negative ions enter into the chamber 2 via the ion entrance 3 and the mesh 4 to which a positive potential (for example, +200 V) has been applied, the negative ions travel toward the cover electrode 15 to which a positive potential (for example, +10 kV) has been applied and the electron incident surface 30a of the APD 30 to which a positive potential (for example, +9.6 kV) has been applied, thereby collide with the cover electrode 15 and the electron incident surface 30a. Positive ions are emitted from the cover electrode 15 and the electron incident surface 30a by the negative ion collisions, and the positive ions travel toward the CD 9 to which a negative potential (for example, -10 kV) has been applied and collide with the CD 9. When secondary electrons are emitted from the CD 9 by the positive ion collisions, the secondary electrons are made incident into the electron incident surface 30a of the APD 30 to which a positive potential (for example, +9.6 kV) has been applied via the electron passage port 16 of the cover electrode 15 to which a positive potential (for example, +10 kV) has been applied and detected by the APD 30.

According to the ion detector 1E, since the electron incident surface 30a is located closer to the conversion dynode 9 than the part which supports the APD 30, a distance between the conversion dynode 9 and the electron incident surface 30a is shortened to a greater extent. Therefore, it is possible to obtain the same effect as that of the ion detector 1A in the first embodiment.

Further, according to the ion detector 1E, the lead pin 44 is electrically connected to the stem 21 and the cap 22. Thereby, a potential equal to that of the n-electrode 36 can be applied without installing a lead pin only for applying a predetermined positive potential to the stem 21. Therefore, the ion detector 1E can be simplified in structure. Still further, a circuit substrate 10B is installed on the circuit substrate 10 via a spacer, by which the circuit substrate has a two-stage structure to improve the withstanding pressure.

Seventh Embodiment

Figure 14:
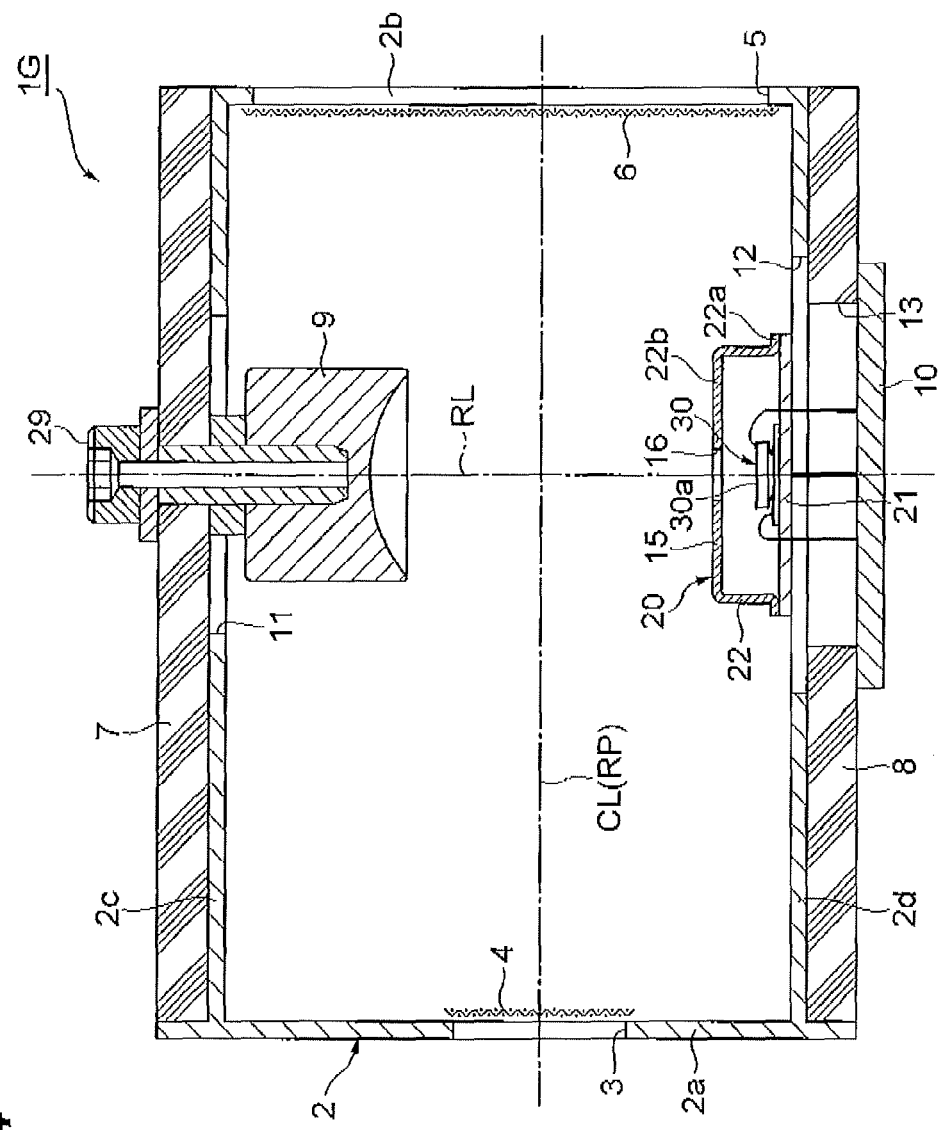
FIG. 14 is a longitudinal sectional view of an ion detector of an eighth embodiment of the present invention.

Next, a description will be given of the ion detector of the seventh embodiment. FIG. 14 is an enlarged view which shows the ion detector of the seventh embodiment in a state of being electrically connected to an avalanche photodiode.

An ion detector 1F is different from the ion detector 1A of the first embodiment in that not only positive ions but also negative ions are detected. The ion detector 1F is different from the ion detector 1A in that a stem 21 is electrically insulated from a chamber 2 (refer to FIG. 11). Further, the ion detector 1F is different from the ion detector 1A in that a lead pin 43 is electrically connected to the stem 21 (refer to FIG. 13).

Figure 13:
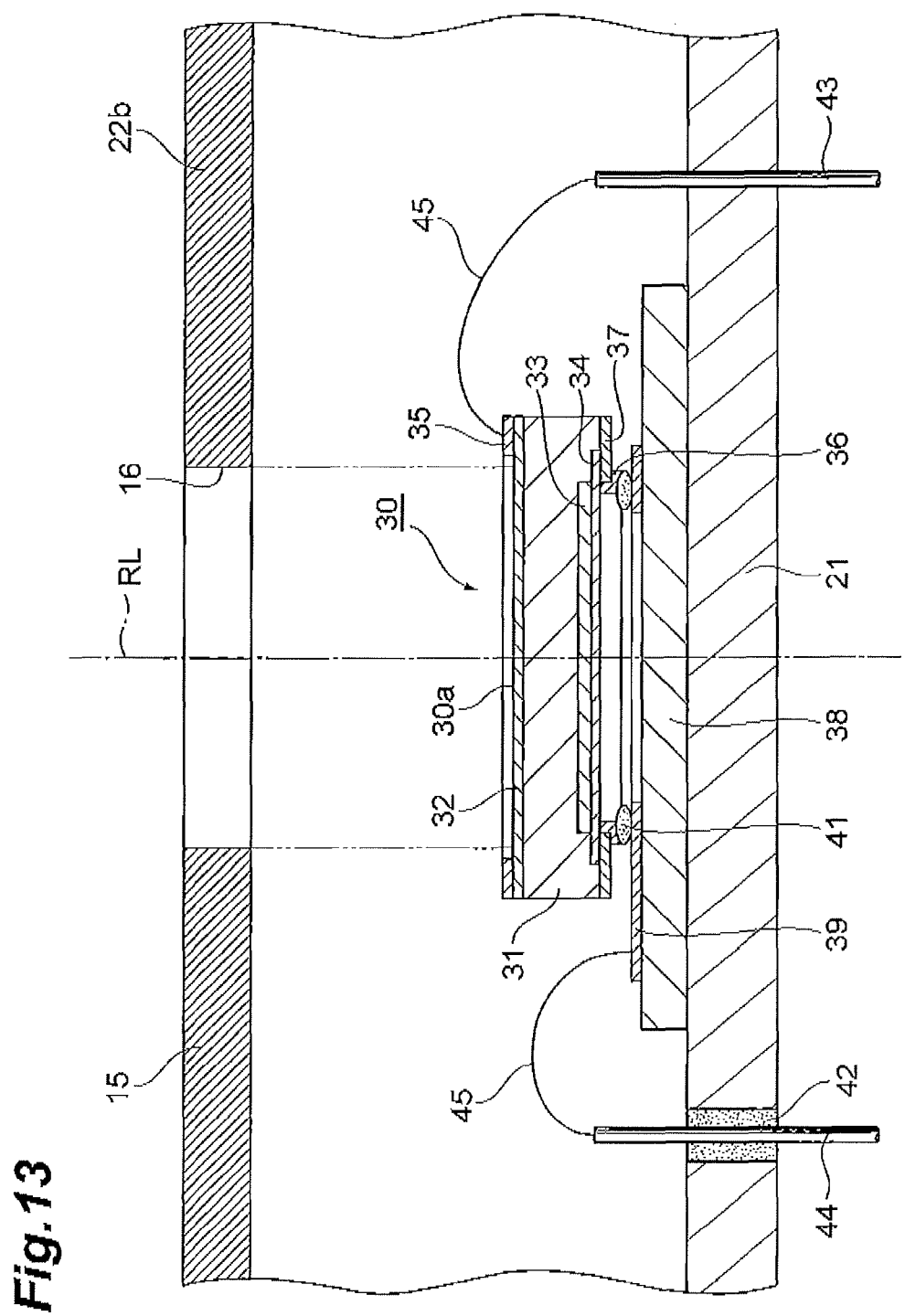
FIG. 13 is an enlarged view which shows the ion detector of the seventh embodiment in a state of being electrically connected to an avalanche photodiode.

As shown in FIG. 13, the lead pin 43 of the ion detector 1F is fixed directly to the stem 21 and thereby electrically connected to the stem 21. The lead pin 43 is a pin which is connected to a p-electrode 35. Therefore, the stem 21 which is electrically connected to the lead pin 43 becomes equal in potential to the p-electrode. According to the ion detector 1F, as with the ion detector 1E of the sixth embodiment, a potential of the stem 21 is electrically insulated from a ground potential of the chamber 2, thus making it possible to reduce an influence of noise which may be mixed from the chamber 2.

Eighth Embodiment

Figure 15:
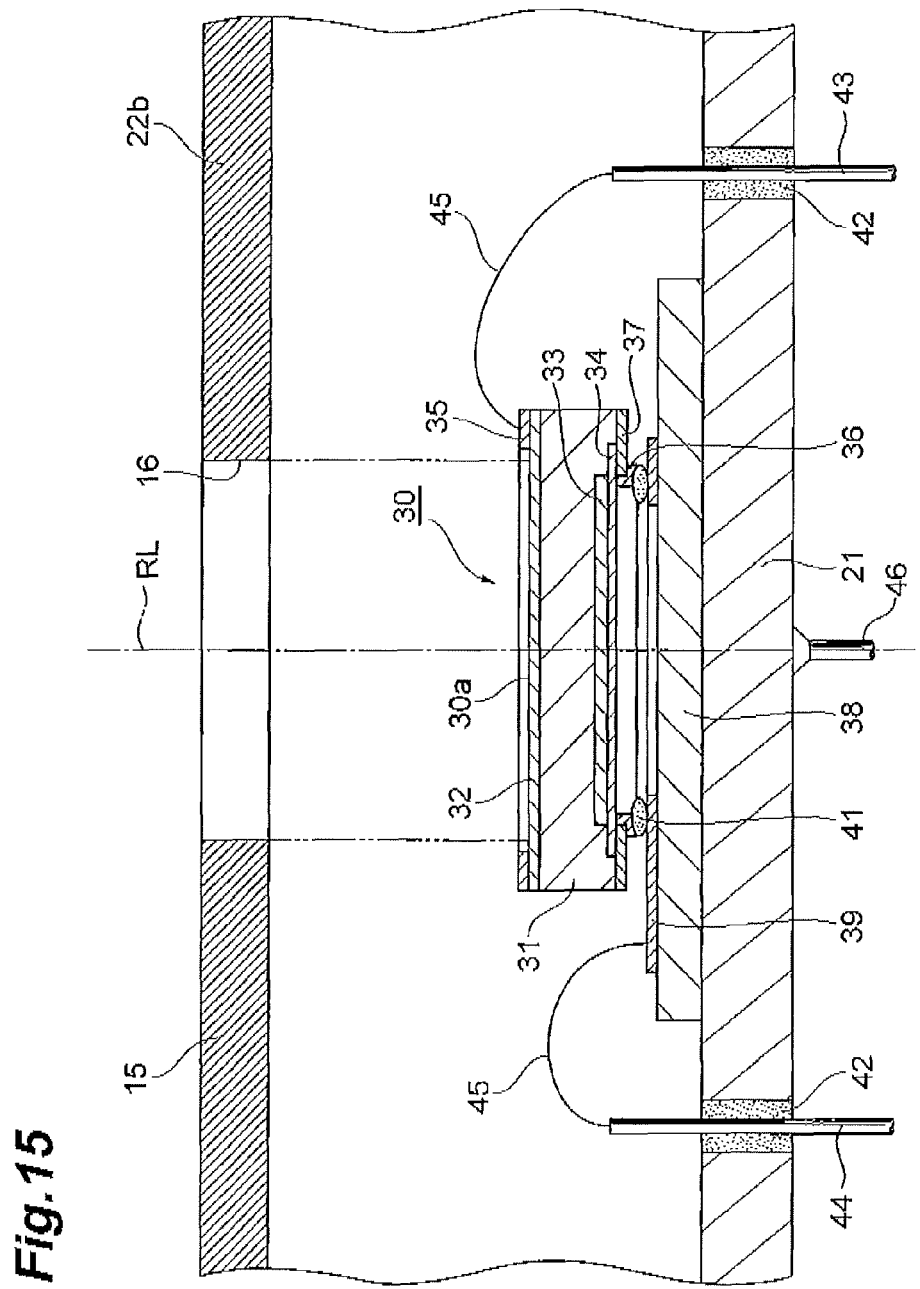
FIG. 15 is an enlarged view which shows the ion detector of the eighth embodiment in a state of being electrically connected to an avalanche photodiode.

Next, a description will be given of the ion detector of the eighth embodiment. FIG. 14 is a longitudinal sectional view of the ion detector of the eighth embodiment in the present invention. FIG. 15 is an enlarged view which shows the ion detector of the eighth embodiment in a state of being electrically connected to an avalanche photodiode.

As shown in FIG. 14, an ion detector 1G is provided with a rectangular parallelepiped box-shaped chamber (housing) 2 which is made of SUS (stainless steel). On a side wall 2a of the chamber 2, there is installed an ion entrance 3 having a circular shape in section (for example, about 10 mm in diameter) which allows positive ions and negative ions to enter. A mesh (first mesh) 4 which is made of SUS is placed at the ion entrance 3 so as to run along an inner surface of the side wall 2a. On a side wall 2b of the chamber 2 which is opposed to the side wall 2a, there is installed an opening 5 which includes the ion entrance 3, when viewed from a direction in which the side wall 2a is opposed to the side wall 2b. A mesh 6 made of SUS is placed at the opening 5 so as to run along an inner surface of the side wall 2b. An insulating member 7 made of a PEEK (polyether ether ketone) resin is disposed on an outer surface of a top wall 2c of the chamber 2. An insulating member 8 made of a PEEK resin is disposed on an outer surface of a bottom wall 2d of the chamber 2.

A cylindrical (for example, about 12 mm in diameter) conversion dynode 9 which is made of SUS (hereinafter, referred to as "CD 9") is disposed in the chamber 2. The CD 9 is fixed to the insulating member 7 with a screw 29 or the like via an opening 11 installed on the top wall 2c of the chamber 2. Further, an avalanche photodiode 30 (hereinafter, referred to as "APD 30") is disposed in the chamber 2 in a state of being housed in a package 20. An opening 12 and an opening 13 are installed respectively on the bottom wall 2d of the chamber 2 and the insulating member 8. The opening 12 and the opening 13 are blocked by a circuit substrate 10 from outside the chamber 2. The circuit substrate 10 is hermetically fixed to an outer surface of the insulating member 8.

The package 20 is provided with a circular-plate like stem 21 made of Kovar and a cylindrical cap 22 made of SUS. An end of the cap 22 on the side of the stem 21 is given as an outward flange 22a, and an end of the cap 22 on the side opposite to the stem 21 is given as an inward flange 22b. The package 20 is disposed in the chamber 2 and supported on the circuit substrate 10 in a state of being electrically insulated from the chamber 2.

The APD 30 is provided with an electron incident surface 30a which is opposed to the CD 9 and into which secondary electrons emitted from the CD 9 are made incident. On the other hand, the cap 22 of the package 20 functions as a cover electrode 15, and an inner region of the inward flange 22b of the cap 22 functions as an electron passage port 16 having a circular shape in section (for example, about 3 mm in diameter) through which secondary electrons traveling from the CD 9 to the APD 30 pass. That is, a part of the package 20 which houses the APD 30 is given as the cover electrode 15 disposed in the chamber 2. The electron incident surface 30a includes the electron passage port 16, when viewed from a direction in which the CD 9 is opposed to the electron incident surface 30a (refer to the alternate long and two short dashed lines in FIG. 15).

Here, a reference line RL which connects a center point of the CD 9 with a center point of the electron incident surface 30a of the APD 30 is substantially orthogonal to a center line CL of the ion entrance 3. In other words, when a predetermined plane which is substantially orthogonal to the reference line RL and also includes the center line CL is given as a reference plane RP, the CD 9 and the electron incident surface 30a of the APD 30 are positioned with respect to the ion entrance 3 in such a manner that the reference plane RP substantially orthogonal to the reference line RL includes the center line CL. It is noted that a recessed curved surface which is opposed to the electron incident surface 30a in the CD 9 is, for example, about 8.5 mm in curvature radius, and a distance between a bottom of the recessed curved surface and the electron passage port 16 of the cover electrode 15 (distance along the reference line RL) is, for example, about 20 mm.

As shown in FIG. 15, the APD 30 is provided with a low concentration p-type silicon substrate 31 in the shape of a rectangular plate. A high concentration p-layer 32 is formed on a surface layer of the silicon substrate 31 which is on the side into which electrons are made incident. On a surface layer of the silicon substrate 31 which is on the side opposite to the side into which electrons are made incident, a p-layer 33 and a high concentration n-layer 34 are formed in this order from the side into which electrons are made incident, thereby realizing a pn joint. A p-electrode 35 which is electrically connected to the high concentration p-layer 32 is annularly formed on a surface of the high concentration p-layer 32 which is on the side into which electrons are made incident. In the APD 30, the surface of the high concentration p-layer 32 which is exposed from an inner region of the p-electrode 35 to the side into which electrons are made incident is given as the electron incident surface 30a. On the surface of the high concentration n-layer 34 which is on the side opposite to the side into which electrons are made incident, an n-electrode 36 which is electrically connected to the high concentration n-layer 34 is annularly formed. It is noted that on the surface of the high concentration n-layer 34 which is on the side opposite to the side into which electrons are made incident, a silicon oxide film 37 is formed so as to cover an outer region of the n-electrode 36.

The APD 30 is electrically connected and fixed to a wiring 39 of an interposer substrate 38 disposed on the stem 21 via a plurality of annularly disposed bumps 41. A plurality of lead pins 43, 44 penetrate through the stem 21 via an insulating member 42 made of glass or the like. The lead pin 43 is a pin for applying a reverse bias voltage and electrically connected to the p-electrode 35 of the APD 30 via a wire 45. The lead pin 44 is a pin for outputting a signal and electrically connected to the wiring 39 of the interposer substrate 38 via the wire 45. Further, a lead pin 46 for applying a predetermined potential to the package 20 (that is, the stem 21 and the cap 22) is fixed to the stem 21. It is noted that an outer end of each of the lead pins 43, 44, 46 is electrically connected to the circuit substrate 10 and the package 20 is supported on the circuit substrate 10 by these lead pins 43, 44, 46 (refer to FIG. 14).

The above-configured ion detector 1G is mounted at a predetermined position, for example, inside a device (inside a mass spectrometer or the like) to be vacuumed and detects positive ions and negative ions. In this case, in the ion detector 1G, the chamber 2 is grounded and kept at 0 V. At this time, a positive potential (+10 kV) is applied via the lead pin 46 to the package 20 (that is, the stem 21 and the cap 22 (the cover electrode 15)) electrically insulated from the chamber 2 kept at 0 V. While the chamber 2 is kept at 0 V, a positive potential (for example, +200 V) and a negative potential (for example, −200 V) are selectively applied to the mesh 4. Further, while the chamber 2 is kept at 0 V, a negative potential (for example, −10 kV) is applied to the CD 9. Still further, in the APD 30, a positive potential (for example, +10 kV) is applied to the n-electrode 36 via the lead pin 44, and a positive potential (for example, +9.6 kV) is applied as a reverse bias voltage to the p-electrode 35 via the lead pin 43.

Thereby, a negative equipotential surface formed by the CD 9 and a positive equipotential surface formed by the cover electrode 15 and the electron incident surface 30a of the APD 30 are substantially symmetrical with respect to the plane of the reference plane RP. That is, at least a vicinity of an intersection between the reference plane RP and the reference line RL (that is, a vicinity of an intersection between the center line CL of the ion entrance 3 and the reference line RL) is to be substantially 0 V.

Where positive ions are detected by the ion detector 1G, a negative potential (for example, −200 V) is applied to the mesh 4. Then, when positive ions enter into the chamber 2 via the ion entrance 3 and the mesh 4 to which a negative potential (for example, −200 V) has been applied, the positive ions travel toward the CD 9 to which a negative potential (for example, −10 kV) has been applied and collide with the CD 9. When secondary electrons are emitted from the CD 9 by the positive ion collisions, the secondary electrons are made incident into the electron incident surface 30a of the APD 30 to which a positive potential (for example, +9.6 kV) has been applied via the electron passage port 16 of the cover electrode 15 to which a positive potential (for example, +10 kV) has been applied and detected by the APD 30. If a difference in potential (accelerating voltage) between the CD 9 and the cover electrode 15 is, for example, 20 kV, the energy of electrons made incident into the APD 30 is to be 20 keV. At this time, in the APD 30, about 4,000 electron-hole pairs are produced from one electron made incident into the silicon substrate 31 (a gain of about 4,000 times). Further, a gain of about 50 times (a total gain of about 200,000 times) is obtained at the p-layer 33 and the high concentration n-layer 34, each of which is an avalanche layer.

On the other hand, where negative ions are detected by the ion detector 1G, a positive potential (for example, +200 V) is applied to the mesh 4. Then, when negative ions enter into the chamber 2 via the ion entrance 3 and the mesh 4 to which a positive potential (for example, +200 V) has been applied, the negative ions travel toward the cover electrode 15 to which a positive potential (for example, +10 kV) has been applied and the electron incident surface 30a of the APD 30 to which a positive potential (for example, +9.6 kV) has been applied and collide with the cover electrode 15 and the electron incident surface 30a. Positive ions are emitted from the cover electrode 15 and the electron incident surface 30a by the negative ion collisions. And, the positive ions travel to the CD 9 to which a negative potential (for example, −10 kV) has been applied and collide with the CD 9. When secondary electrons are emitted from the CD 9 by the positive ion collisions, the secondary electrons are made incident into the electron incident surface 30a of the APD 30 to which a positive potential (for example, +9.6 kV) has been applied via the electron passage port 16 of the cover electrode 15 to which a positive potential (for example, +10 kV) has been applied and detected by the APD 30.

As described so far, in the ion detector 1G, use of the APD 30 eliminates the need for a scintillator which converts secondary electrons to light, a light guide for guiding the light into a photoelectric multiplier or the like. It is thus possible to simplify the structure. Further, the APD 30 is lower in multiplication fluctuation and greater in the number of detectable ions, for example, compared with a photoelectric multiplier, thus making it possible to improve an S/N ratio and also enlarge a D range. Therefore, according to the ion detector 1G, it is possible to improve the detection accuracy and simplify the structure.

Regarding the above-described improvement in the S/N ratio, the APD 30 is lower in multiplication fluctuation, for example, compared with a photoelectric multiplier, and it is therefore also able to discriminate the number of electrons converted by the CD 9 with reference to a crest value of an output signal. Thereby, it is possible to tell whether collisions are made with ions greater in mass (ions lower in the number of electrons produced by the CD 9) or with ions smaller in mass. This results in effects of reducing noise in a mass spectrometer. Where ions smaller in mass are scanned inside a mass spectrometer or the like, a pulse lower in wave height becomes noise and a pulse higher in wave height becomes a signal. On the other hand, where ions greater in mass are scanned in a mass spectrometer or the like, a pulse lower in wave height becomes a signal and a pulse higher in wave height becomes noise.

Further, regarding the above-described enlargement of the D range, where the number of ions which have entered into the chamber 2 via the ion entrance 3 is great, the APD 30 is able to output more electric current, for example, compared with a photoelectric multiplier. On the other hand, where the number of ions which have entered into the chamber 2 via the ion entrance 3 is small, it is also possible to count the number of ions, for example, as with a photoelectric multiplier.

Further, in the ion detector 1G, a negative equipotential surface formed by the CD 9 and a positive equipotential surface formed by the cover electrode 15 and the electron incident surface 30a of the APD 30 are substantially symmetrical with respect to the plane of the reference plane RP. Thereby, positive ion trajectories to the CD 9, negative ion trajectories to the cover electrode 15 and the electron incident surface 30a as well as secondary electron trajectories to the electron incident surface 30a can be converged. And, it is possible to improve the incidence efficiency of positive ions in the CD 9, the incidence efficiency of negative ions in the cover electrode 15 and the electron incident surface 30a as well as the incidence efficiency of secondary electrons on the electron incident surface 30a.

Still further, the electron incident surface 30a of the APD 30 includes the electron passage port 16 of the cover electrode 15, when viewed from a direction in which the CD 9 is opposed to the electron incident surface 30a (that is, a direction parallel to the reference line RL). Thereby, it is possible to suppress deterioration of the APD 30 due to secondary electron collisions with sites other than the electron incident surface 30a in the APD 30.

Still further, a part of the package 20 which houses the APD 30 (more specifically, the inward flange 22b of the cap 22) is given as the cover electrode 15. As described so far, a part of the package 20 is effectively used as the cover electrode 15, which also contributes to the structural simplification of the ion detector 1G.

Still further, the cover electrode 15 is electrically insulated from the chamber 2 which is to be grounded. It is, thereby, possible to stabilize electrically the chamber 2.

In addition, the mesh 4 to which a positive potential and a negative potential are selectively applied is placed at the ion entrance 3. Thereby, where positive ions are allowed to enter into the chamber 2 to detect positive ions, a negative potential is applied to the mesh 4, thus making it possible to suppress the formation of a positive electric field inside the ion entrance 3 and improve the incidence efficiency of positive ions in CD 9. On the other hand, where negative ions are allowed to enter into the chamber 2 to detect the negative ions, a positive potential is applied to the mesh 4, thus making it possible to suppress the formation of a negative electric field inside the ion entrance 3 and improve the incidence efficiency of negative ions in the cover electrode 15 and the electron incident surface 30a of the APD 30.

In the ion detector 1G, the APD 30 is downsized for the purpose of obtaining favorable time characteristics. Thus, in such a manner that secondary electrons can be converged to the smallest possible extent, a recessed curved surface of the CD 9 is decreased in curvature radius to increase the magnification as a lens and also reduce a distance between the CD 9 and the APD 30.

Further, in the ion detector 1G, the opening 5 is installed at a position in opposition to the ion entrance 3, and the mesh 6 placed inside the opening 5 is kept at 0 V. Thereby, an electrostatic lens which is converged to the CD 9 and the electron incident surface 30a of the APD 30 is formed to prevent the occurrence of noise due to neutrality or the like.

A description has been so far given of one embodiment of the present invention to which the present invention shall not be, however, limited. For example, components of the ion detector 1G are not limited to the shapes and materials described above but available in various shapes and materials. Further, the cover electrode 15 which has the electron passage port 16 may not be a part of the package 20 but may be provided in separation from the package 20. However, in any case, it is possible to use a material high in conversion rate from negative ions to positive ions as a material of the cover electrode 15.

The other mesh (second mesh) may be placed at the ion entrance 3 so as to be located outside with respect to the mesh 4, and a positive potential (for example, +20 V) and a negative potential (for example, –20 V) may be selectively applied to the mesh so as to have an absolute value smaller than that of a potential applied to the mesh 4 and also so as to have a polarity opposite to that of a potential applied to the mesh 4. According to the above-described configuration, where positive ions are allowed to enter into the chamber 2, thereby detecting the positive ions, a positive potential (for example, +20 V) is applied to the other mesh, by which positive ions relatively low in energy are repulsed and only positive ions relatively high in energy are allowed to pass. At this time, the negative ions are repulsed by the mesh 4 to which a negative potential (for example, –200 V) has been applied. On the other hand, where negative ions are allowed to enter into the chamber 2, thereby detecting the negative ions, a negative potential (for example, –20 V) is applied to the other mesh, by which negative ions relatively low in energy are repulsed and only negative ions relatively high in energy are allowed to pass. At this time, the positive ions are repulsed by the mesh 4 to which a positive potential (for example, +200 V) has been applied. The energies of positive ions to be noise are often lower than the energies of positive ions which are to be detected. Therefore, positive ions relatively low in energy are prevented from entering into the chamber 2, thus making it possible to improve the S/N ratio of the ion detector 1G. However, even if no mesh is placed at the ion entrance 3, it is possible to improve the S/N ratio and enlarge the D range in the APD 30 as compared with a conventional case.

Further, a pair of electrode members which are to be equal in potential to the chamber 2 may be disposed in the chamber 2 so as to be located closer to the ion entrance 3 than the CD 9 and the electron incident surface 30a of the APD 30 and also so as to sandwich the ion entrance 3 in a direction substantially orthogonal to a direction in which the CD 9 is opposed to the electron incident surface 30a, when viewed from the ion entrance 3 side (that is, a direction parallel to the center line CL). According to the above-described configuration, even when the ion entrance 3 is formed so as to have a sectional shape taking as its longitudinal direction the direction in which, for example, the pair of electrode members are opposed, it is possible to converge positive ion trajectories to the CD 9 and negative ion trajectories to the cover electrode 15 and the electron incident surface 30a and also improve the incidence efficiency of positive ions in the CD 9 and the incidence efficiency of negative ions in the cover electrode 15 and the electron incident surface 30a.

The semiconductor electron detector shall not be limited to the avalanche photodiode 30. The semiconductor electron detector may include a generally available photo diode (hereinafter referred to as a "PD") which is free of the multiplication function. The ion detectors 1, 1A to 1G, each of which is provided with a PD, may be available as so-called analog-type detectors for obtaining electric current upon incidence of electrons. Further, a PD is stable in fluctuation of gain in association with change in temperature, as compared with an APD. Thus, a PD may be used as a semiconductor electron detector, where a higher gain attained by an APD is not required or where no ion single counting is needed (for example, in field use). As the above-described PD, there can be used, for example, Si photo diodes (S11141, S11142) for detecting electron beams or the like which are made by Hamamatsu Photonics K.K. The semiconductor electron detector also includes a semiconductor element which has a structure similar to that of the APD or the PD.

Further, in the above-described fourth to eighth embodiments, the semiconductor electron detector (the APD or the PD) may be either a front-illuminated type or a back-illuminated type.

Still further, in the first to eighth embodiments, a part which supports the APD 30 indirectly supports the APD 30 via the stem 21. However, the present invention shall not be limited to this configuration. That is, the part which supports the APD 30 may directly support the APD 30 not via the stem 21.

The present invention is able to provide an ion detector which is capable of improving the detection accuracy and simplifying the structure.

What is claimed is:

1. An ion detector which detects positive ions, the ion detector comprising:
    a housing which is provided with an ion entrance that allows the positive ions to enter;
    a conversion dynode which is disposed in the housing and to which a negative potential is applied; and
    a semiconductor electron detector that is disposed in the housing and provided with an electron incident surface which is opposed to the conversion dynode and into which secondary electrons emitted from the conversion dynode are made directly incident, wherein
    the electron incident surface is located closer to the conversion dynode than a part which supports the semiconductor electron detector in the grounded housing, and
    the part which supports the semiconductor electron detector is contained in the grounded housing and has a difference in potential that accelerates the secondary electrons with respect to the conversion dynode.

2. The ion detector according to claim 1, further comprising a cover electrode that is disposed in the housing and has an electron passage port through which the secondary electrons traveling from the conversion dynode to the semiconductor electron detector pass, wherein
    the semiconductor electron detector is an avalanche photodiode.

3. The ion detector according to claim 2, wherein the electron incident surface includes the electron passage port, when viewed from a direction in which the conversion dynode is opposed to the electron incident surface.

4. The ion detector according to claim 2, wherein the cover electrode is a part of a package which houses the semiconductor electron detector.

5. The ion detector according to claim 2, wherein the cover electrode is electrically connected to the housing which is to be grounded.

6. The ion detector according to claim 1, wherein a first mesh to which a negative potential is applied is placed at the ion entrance.

7. The ion detector according to claim 6, wherein a second mesh is placed at the ion entrance so as to be located outside with respect to the first mesh, and a positive potential is applied to the second mesh so as to have an absolute value smaller than that of a potential to be applied to the first mesh.

8. The ion detector according to claim 1, wherein in the housing, a pair of electrode members which are equal in potential to the housing are disposed so as to be located closer to the ion entrance than the conversion dynode and the electron incident surface and also so as to sandwich the ion entrance in a direction substantially orthogonal to a direction in which the conversion dynode is opposed to the electron incident surface, when viewed from the ion entrance side.

9. The ion detector according to claim 1, wherein the semiconductor electron detector has an annular electrode formed on a surface of the semiconductor electron layer that is opposed to the conversion dynode, and the electron incident surface is a region exposed from an inside region of the electrode to an electron incident side.

* * * * *